United States Patent [19]

Chandra et al.

[11] Patent Number: 4,817,140

[45] Date of Patent: Mar. 28, 1989

[54] SOFTWARE PROTECTION SYSTEM USING A SINGLE-KEY CRYPTOSYSTEM, A HARDWARE-BASED AUTHORIZATION SYSTEM AND A SECURE COPROCESSOR

[75] Inventors: Ashileshwari N. Chandra, Mahopac; Liam D. Comerford, Carmel; Steve R. White, New York, all of N.Y.

[73] Assignee: International Business Machines Corp., Armonk, N.Y.

[21] Appl. No.: 927,629

[22] Filed: Nov. 5, 1986

[51] Int. Cl.$^4$ ............................................. H04L 9/00
[52] U.S. Cl. ........................................ 380/4; 380/25
[58] Field of Search .................. 364/200, 900; 380/4, 380/25, 23

[56] References Cited

U.S. PATENT DOCUMENTS

| | | | |
|---|---|---|---|
| 3,996,449 | 12/1976 | Attanasio | 235/61.7 R |
| 4,104,721 | 8/1978 | Markstein | 364/200 |
| 4,120,030 | 10/1978 | Johnstone | 364/200 |
| 4,168,396 | 9/1979 | Best | 178/22 |
| 4,183,085 | 1/1980 | Roberts | 364/200 |
| 4,246,638 | 1/1981 | Thomas | 364/200 |
| 4,278,837 | 7/1981 | Best | 178/22.09 |
| 4,433,207 | 2/1984 | Best | 178/22.09 |
| 4,442,484 | 4/1984 | Childs, Jr. | 364/200 |
| 4,446,519 | 5/1984 | Thomas | 364/200 |
| 4,458,315 | 7/1984 | Uchenick | 364/200 |
| 4,462,078 | 7/1984 | Ross | 364/300 |
| 4,465,901 | 8/1984 | Best | 178/22.08 |
| 4,471,163 | 9/1984 | Donald et al. | 364/200 |
| 4,471,216 | 9/1984 | Herve | 235/380 |
| 4,513,174 | 4/1985 | Herman | 178/22.08 |
| 4,523,271 | 6/1985 | Levien | 364/200 |
| 4,525,599 | 6/1985 | Curran et al. | 364/200 |
| 4,558,176 | 12/1985 | Arnold et al. | 178/22.08 |
| 4,562,305 | 12/1985 | Gaffney, Jr. | 178/22.08 |
| 4,562,306 | 12/1985 | Chou | 178/22.08 |

(List continued on next page.)

OTHER PUBLICATIONS

Best, Preventing Software Piracy with Crypto-Microprocessors, IEEE, 1980.

(List continued on next page.)

[57] ABSTRACT

The invention provides a software asset protection mechanism which is based on the separation of the software to be protected from the right to execute that software. Protected software can only be executed on composite computing systems in which a physically and logically secure coprocessor is associated with a host computer. The software to be protected is broken down into a protected (encrypted) portion and an (optional) unprotected or plain text portion. The software is distributed by any conventional software distribution mechanism (for example a floppy disk) including the files already identified along with an encrypted software decryption key. The coprocessor is capable of decrypting the software decryption key so it can thereafter decrypt the software, for execution purposes. However, the coprocessor will not perform these functions unless and until the user's right to execute is evidenced by presentation of a physically secure token. The physically secure token provides to the coprocessor token data in plain text form (the physical security of the plain text token data is provided by the cartridge within which token data is stored). The physical properties of that cartridge taken together with the correspondence between the token data provided by the cartridge and the encrypted token data evidence the user's right to execute. While the coprocessor can, thereafter, decrypt and execute the protected portion of the software, access to that software is denied the user by the physical and logical features of the coprocessor. Other properties of the cartridge (specifically a destructive read property) ensure that the act of transferring token data to the coprocessor obliterates that data from the cartridge so it cannot be revised. Further, the protocol for the coprocessor/cartridge exchange is arranged so that observation of even the entire exchange provides inadequate information with which to simulate or spoof the effect of an authentic, unused cartridge.

35 Claims, 8 Drawing Sheets

U.S. PATENT DOCUMENTS

| | | | |
|---|---|---|---|
| 4,577,289 | 3/1986 | Comerford | 364/900 |
| 4,598,288 | 7/1986 | Yarbrough | 340/825.34 |
| 4,599,489 | 7/1986 | Cargile | 178/22.08 |
| 4,609,777 | 9/1986 | Cargile | 178/22.08 |
| 4,609,985 | 9/1986 | Dozier | 364/200 |
| 4,621,321 | 11/1986 | Boebert et al. | 364/200 |
| 4,621,334 | 11/1986 | Garcia | 364/550 |
| 4,633,388 | 12/1986 | Chiu | 364/200 |
| 4,644,493 | 2/1987 | Chandra et al. | 364/900 |
| 4,652,990 | 3/1987 | Pailen et al. | 364/200 |

OTHER PUBLICATIONS

Everett, "Padlock", Computer Bulletin, Mar. 1985, pp. 16–17 + Padlock Public Key Software Protection System.

Goldschmitt, "Thou Shall Not Dupe", Computerworld, Jan. 28, 1985.

Herzberg, "Public Protection of Software", Lecture Notes in Computer Science, vol. 218, 1986 (Proc. Crypto 85), pp. 158–178.

Kent, Protecting Externally Supplied Software in Small Computers, Phd. thesis, M.I.T., Sep. 1980.

Lipson, "Little Black Box 'Blocks' Illicit Software Copying", Stamford Advocate, Sep. 14, 1986, pp. E1–E2.

Maude, "Hardware Protection Against Software Piracy", Communications of the ACM, vol. 27, No. 9, Sep. 1984, pp. 950–959.

Purdy, "A Software Protection Scheme", IEEE, 1982.

Simmons, "How to (Selectively) Broadcast a Secret", IEEE, 1985.

Winslow, "For Software Firms, Questions is How to Cope with Piracy", Wall Street Journal, Apr. 12, 1985.

*Primary Examiner*—Gareth D. Shaw
*Assistant Examiner*—John G. Mills
*Attorney, Agent, or Firm*—Pollock, Vande Sande & Priddy

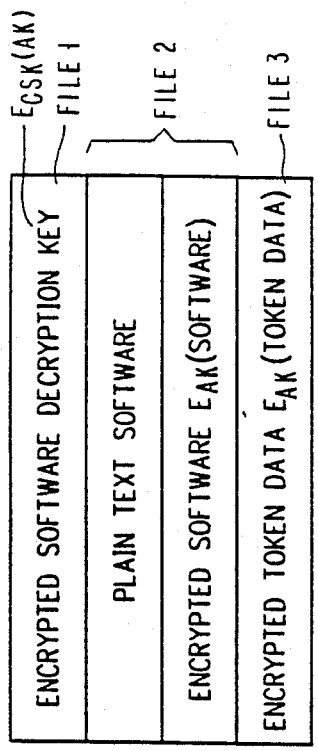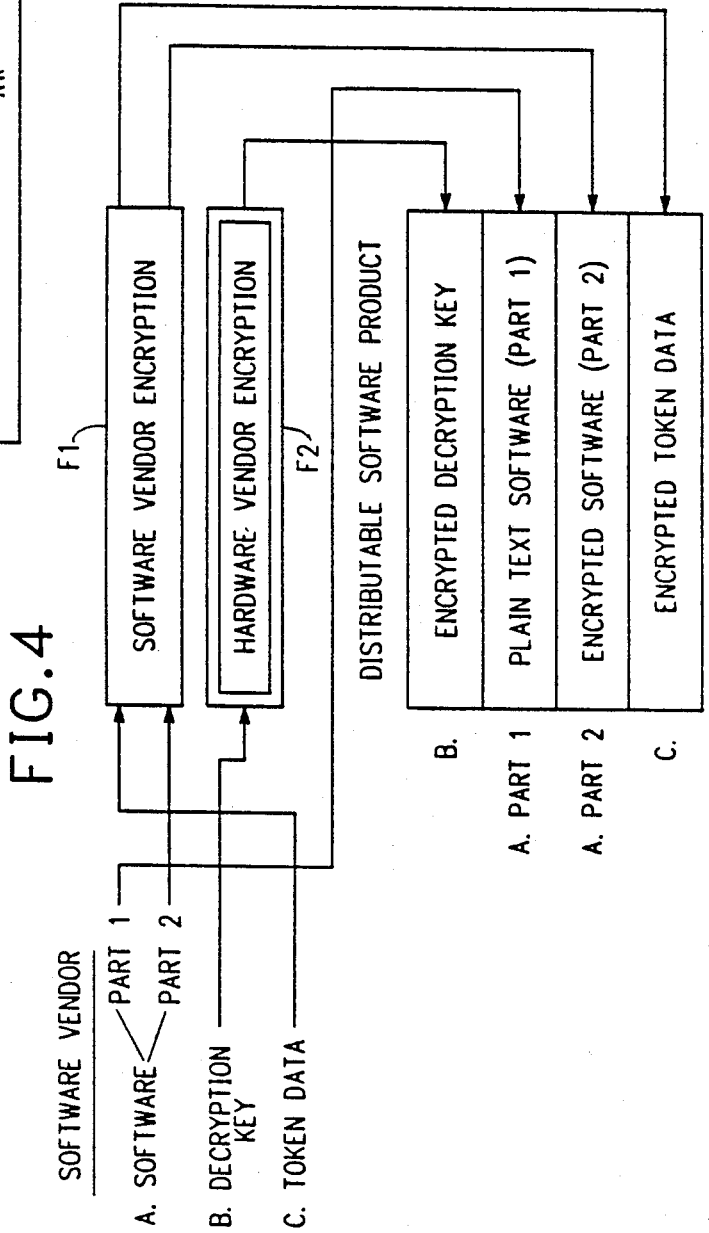
FIG.3
FIG.4

DOS SERVICE IN HOST

SOFTWARE PROTECTION SYSTEM USING A SINGLE-KEY CRYPTOSYSTEM, A HARDWARE-BASED AUTHORIZATION SYSTEM AND A SECURE COPROCESSOR

DESCRIPTION

TECHNICAL FIELD

The invention is in the field of data processing and is specifically directed to a software copy protection mechanism. In particular a mechanism is provided which restricts software, distributed on magnetic disk or other medium, to use on any computer which is associated with a specified, physically secure coprocessor where the mechanism does not interfere with the user creation of "backup" copies, but the protection is not compromised by any such "backup" copies.

CROSS-REFERENCE TO CO-PENDING APPLICATIONS

Reference is made to the following co-pending applications, assigned to the assignee of this application:

U.S. patent application Ser. No. 927,309, filed Nov. 5, 1986; U.S. patent application Ser. No. 927,306, filed Nov. 5, 1986; U.S. patent application Ser. No. 927,298, filed Nov. 5, 1986; U.S. patent application Ser. No. 927,286, filed Nov. 5, 1986; U.S. patent application Ser. No. 927,297, filed Nov. 5, 1986; and U.S. patent application Ser. No. 927,299, filed Nov. 5, 1986.

BACKGROUND ART

A good description of the background art to the invention is provided in the applicants co-pending U.S. Pat. No. 4,644,493, filed Sept. 14, 1984.

In addition to the prior art identified in the referenced application, Uchenick U.S. Pat. No. 4,458,315 suggests a security procedure for protecting software in which the software is distributed with a key number (first key information). In order for the software to be run on a computer, the computer must have access to a device storing "second key information". The program will not properly execute unless the first and second key information bears some specified relation. The patent however does not describe use of a transaction token which forms an important component of the present invention, nor is there any apparent impediment to deter a pirate from merely altering the software so it can execute without this comparison step nor does the patent describe how the computer obtains access to the "record key information" in such a way that that access cannot be duplicated or forged.

Jones Futurex, Inc. describe a software protection product which employs a decryption board which stores a decryption key in "write only" mode. This product comes in fixed key and variable key models. The fixed key model would require the software vendor to personalize each different software copy to a different key. While the variable key product might not have this failing, the product description does not describe how the variable key can be loaded except to say this is accomplished by "an remote communications processor". Such a scheme for distributing decryption keys is inconsistent with the distribution methods in common use. This drawback does not characterize the system taught by this disclosure.

Best, in U.S. Pat. Nos. 4,168,396; 4,278,837 and 4,465,901, describes a program protection mechanism which makes use of enciphered programs. However, Best suggests that each copy of a program be customized so that it is only executable on a single microprocessor, i.e. in a single, physically unique microprocessor. This protection appears breakable by discovering the key needed to decrypt the software and by other cryptanalytic techniques. However, as a practical technique for protecting software, it is unusable. A software vendor must sell each copy of his software (which has been customized), along with the microprocessor which has been customized to run the associated software. The only alternative is for the vendor to identify which microprocessor the user owns so that the software can be customized for it. To the extent that the software vendor allows the software to be run on a class of microprocessors (say all 80286), then the protection is lost, for duplicates of the software will freely run on all microprocessors of the class.

The referenced U.S. Pat. No. 4,644,493 describes a method for recording data on magnetic media in such a way that the act of reading the data alters it. Such "read once" magnetic recordings cannot be created by conventional disk drives so they cannot be copied by conventional personal computers systems. As described in the referenced application a computer is associated with a physically and logically secure coprocessor and software as distributed on the magnetic media includes at least a significant section or portion which is encrypted. The magnetic media also includes an encrypted decryption key which must be used by the coprocessor to decrypt the encrypted portion of the software. The act of transferring the encrypted decryption key from the magnetic media to the secure coprocessor is linked to the mechanism which alters the data. This assures that, in the absence of extraordinary measures, the encrypted decryption key is not transferable once the magnetic medium has been read. This prevents the creation of copies of the distribution medium which can be employed on other computers, subverting the copy protection mechanism. Once the coprocessor has access to the encrypted decryption key, it can decrypt this key. In the course of executing the software the encrypted portion is decrypted by the coprocessor. This ensures that the software is executable, but prevents the user from obtaining access to the complete software package in decrypted form.

The mechanism described in the referenced application is extremely resistant to attack because the decryption key and the protected fraction of the software are never exposed to the user in unencrypted form. The owner of the software is allowed unlimited backup copies, but these backup copies are useless on any other personal computer (one which does not have access to the specific coprocessor already storing the decryption key). The protection system is open to any software writer for use and any hardware producer for manufacture because it requires no sharing of confidential information (key information) between the involved parties and its methods may be disclosed publicly without compromising its security.

However the read once magnetic recording has two vulnerabilities in a copy protection system. First it is always possible (although costly) to examine the magnetic medium and produce a device which will forge its behavior to a computer system. Second, a determined pirate may be able to build an apparatus which will restore the pre-read state of the "read once" recorded data that has been used to authorize the acceptance of a decryption key by a system. The re-initialized medium could then be used to illicitly "authorize" a second system.

The method, as described in the referenced application requires use of a public key crypto system. This architectural restriction limits the flexibility of the system. In addition the system described in the referenced application requires the use of a bus slot which may not be available on some systems or may be too valuable to a user. This is necessary to allow the coprocessor to observe the host processor bus operations so that it may assure itself that the appearance of the read once magnetic recording is not being simulated by a program on the host computer.

The present invention overcomes the above noted disadvantages in that it firstly does not require a dedicated bus slot for a physically secure coprocessor, it does not rely on public key crypto systems nor does it rely on read once magnetic media. In these respects it is both more versatile and more resistant to attempted piracy than the earlier system.

The present invention is based on the recognition that today's software distribution techniques distribute to the user, in addition to the software itself, the right to execute that software. That is, more particularly, when software is sold to the typical user, the user acquires not only the software itself but the right to use it. However, he can, with a typical personal computer, duplicate the software and distribute it along with the (implied) right to use it to others. The invention seeks to separate the software, from the right to use it. Further, it seeks to place the means of creating these Rights-to-Execute in the hands of the software authors or their representatives. It also seeks to do these things with no perturbation to the existing or planned channels of software distribution and minimum change to the means by which software is prepared for distribution. As will be described below, in accordance with the present invention, the typical software purchaser may still duplicate at will the software he has received from the vendor. However, he cannot duplicate the right to use the software; in fact he receives a single right to use the software. To become effective, that right to use must be installed in a suitable coprocessor, and it is only when the right to use is installed on the suitable coprocessor (which is associated with the host computer on which the user intends to run the software) that the software becomes executable. Other copies of the software that the user might make are not executable on any other host computer (even if such other host computer is associated with another suitable coprocessor).

In accordance with the present invention software can be distributed on magnetic media (such as tape or floppy disk) or by other means (telephone lines, cable or broadcast transmission). The software is partitioned into an encrypted portion $P_e$ and an unencrypted (clear text) portion $P_c$. The choice of the partitioning is made by the software vendor with the understanding that only the encrypted portion will be protected from piracy. The encrypted portion, $P_e$, of the software will be decrypted and executed by a physically and logically secure coprocessor if the coprocessor possesses the decryption key which embodies the right to execute. The protected part of the software is, thus, never exposed in plaintext form and never executed by unauthorized systems. The coprocessor may be attached to the user's personal computer either on the system bus or through a I/O or other communication port.

In order to be effective, and decrypt the encrypted portion of the protected software, the coprocessor must be provided with the decryption key (Right-Right-to-Execute or RTE, also referred to as AK or Application Key) needed to render the encrypted portion of software executable. The key (RTE or AK) must be transferred to the software owner's coprocessor in such a way that the transfer mechanism cannot be reused or reproduced by a user and thus grant key transfer to other personal computers. This is accomplished by associating the effective transfer of the decryption key into the non-volatile memory of the coprocessor with a transaction token, e.g. the presence of the transaction token is required to effectively transfer the decryption key to the coprocessor. The token is very resistant to forgery for reasons which are described below and its information content is destroyed during the transfer transaction. The token has information content which is known to the coprocessor because it is identified in an encrypted file. This file is called the Encrypted Token Description or ETD. This identification is authenticated to the coprocessor by the fact that it is encrypted with the same key (AK) which the software vendor has used to encrypt the protected portion of the software. The ETD may be distributed to the user by placing it in a dedicated register in the token, by recording it on the distribution medium, or by distributing it by other means.

The software vendor supplied key (AK) is made available to the coprocessor by supplying it, in encrypted form, with the program via the software distribution medium or other means as described in the case of the ETD. In the general case, the key used to encrypt the AK is selected from a list of Coprocessor Supervisor Keys (CSKs) which is stored in all coprocessors supplied by a given vendor.

The function of encrypting the software vendor's decryption key with one of these stored encryption keys is a service provided by the coprocessor so that the store of keys (CSKs) need never be exposed to the software vendor. The coprocessor which the software vendor uses to encrypt the software vendor's keys may be precisely the same type of coprocessor as the user employs to decrypt and run the software. Alternatively, special processors may be sold for this purpose or standard processors may be enabled to perform this function by an encrypted message from the hardware manufacturer. These options may be useful in giving flexibility to the marketer of such devices.

For the same reason the software vendor's decryption keys (such as AK) are never exposed to the software user, the hardware vendor's encryption keys (CSK) are never exposed to the software vendor. This system thus has the property that no information need be shared between hardware and software manufacturers in order to use the protection provided. In addition, a single encryption system such as DES may be used for all cryptographic functions.

In accordance with the invention, in order to access the transfer token, the coprocessor is provided with a data path which allows communication with a hardware sub-system such as a cartridge. This data path may utilize a connection to the cartridge supplied by either the host (such as a PC) or the coprocessor. The cartridge contains an electronic memory with properties that change (in a manner to be described) in response to whether the memory is being read from or written to. This cartridge sub-system must be extremely difficult to copy in the sense that a substitute is very unlikely to be created by a user which can fool a coprocessor into accepting it as verification of the user's right to store a given decryption key (AK) in the user's coprocessor. Since the connection to the sub-system is physically exposed, the transaction which uses this connection as its communications medium must be forgery-resistant.

To be forgery-resistant, each transaction must be effectively unique and verifiable by the coprocessor. The technique by which this security is obtained is described below.

The sub-system which is used to verify the right of a user to a particular decryption key is referred to as a transfer token. The necessary functions can be implemented using programs executed by a micro-processor or by using a dedicated hardware system. Inasmuch as the most economical implementation of a transfer token will be a dedicated hardware system, this is the version that is described.

The transfer token hardware and its information content must be kept physically secure to avoid its access by the user through means which bypass the forgery prevention feature. One implementation of this physical security is described in co-pending application Ser. No. 927,309, filed Nov. 5, 1986 the disclosure of which is incorporated by this reference. The same technique may be employed to render the coprocessor itself physically secure and to protect its memory contents from its exposure to a user. Since tokens can be implemented as a single, continuously powered, integrated circuit chip, no additional physical security is needed. If the physical security of a token were broken, then no cryptographic keys would be revealed and only the single associated software package could be redistributed.

Thus, in accordance with the invention, software to be protected is partitioned into a plain text portion and an encrypted portion; the encryption key (AK) used to encrypt the software is known only to the software vendor. The protected software provided to the user is associated with the software decryption key, in encrypted form (EAK). The software decryption key (AK) is encrypted with the hardware vendor's encryption key (CSK) which is not known to the software vendor. This encryption is a service performed by such coprocessors. The software and encrypted decryption key (EAK) may be associated with information describing a transfer token (TOKEN DATA) by encrypting that description under AK. The correspondence between the content of the token and the token data (after decryption under AK) indicates to the coprocessor that that particular AK may be stored for future use. The authorized user is provided with a token, which in a preferred embodiment is implemented in the form of a hardware cartridge. The transfer token is physically and logically secure, so that a sufficient fraction of its information contents is not available to the user. The transfer token, or the hardware cartridge incorporating the transfer token has a read once feature whereby the first time the hardware cartridge is read the contents are altered so that the authorization which the hardware cartridge represents cannot be effectively reused by the user. The user is also provided with a physically and logically secure coprocessor. The physically and logically secure coprocessor has in permanent memory the hardware vendor's decryption key(s) CSK1, CSK2, etc. The data descriptive of the token will typically be transferred with the software.

The first time the user attempts to employ the protected software, he couples the physically and logically secure coprocessor to the computer system in which the protected software is to be run and also couples the hardware cartridge containing the transfer token to the computer system.

On the first running of the software the encrypted software key EAK is transferred to the coprocessor and is decrypted by the coprocessor using the required CSK to obtain AK. For reasons which are explained below, this transfer is temporary, the coprocessor will reject the transfer if the conditions described below are not met. A verifiable portion of the contents of the hardware cartridge, i.e., the transfer token, is also transferred to the coprocessor using a forgery-resistant query/response protocol; this process alters or destroys the contents of the hardware cartridge. The information revealed to an observer of the query and the response is insufficient to allow a forger to construct a correct response to another coprocessor query. The transfer token can be "refilled" with information by a software author, but the refilled transfer token will only authorize a coprocessor to accept an AK from that author. The physically and logically secure coprocessor determines whether or not the transfer token is effective by determining whether or not it corresponds to an expected transfer token. Assuming the transfer token is found acceptable, the coprocessor then stores the software decryption key AK in its permanent memory. At this point the transfer is effective so that the coprocessor can use AK to decrypt and run protected software.

Once the software decryption key AK is stored in the permanent memory of the coprocessor, the protected software can be executed. The plaintext portion of the protected software is executed by the user computer system. The encrypted portion (the protected portion) of the software is decrypted upon loading by the coprocessor. The logical and physical security of the coprocessor memory prevents the user from having access to plaintext or executable form of the protected software.

On each subsequent use of the protected software the software decryption key AK now stored in the permanent memory of the coprocessor is used to decrypt the encrypted portions thereof. The user can make as many "backup" copies of the software as he desires; however without access to a logically and physically secure coprocessor storing the decryption key AK, any "backup" copies of the software are unusable since the encrypted portion of the software cannot be decrypted.

Accordingly, the invention provides a method of restricting use of software to an authorized computer comprising the steps of:

distributing said software in a form in which at least a significant portion is encrypted, providing a coprocessor in association with a potentially authorized processor, which coprocessor has a memory space secured against external access for storing decrypted software and operating instructions, coupling said software to said processor, coupling a distinct right-to-execute to said coprocessor and storing said distinct right-to-execute in said secure memory of said coprocessor, in the presence of said distinct right-to-execute, decrypting and storing said significant portion of said software in said coprocessor for the period needed to execute such software as needed by the user, and executing said stored software portion in said coprocessor.

Typically, in conjunction with execution of the decrypted software by said coprocessor, the authorized processor will execute the remaining portions of the software, e.g. the originally unencrypted portions.

The distinct right-to-execute in a preferred embodiment comprises a decryption key for the encrypted portions of the software. While the decryption key may be distributed along with the software, it is distributed in encrypted form. The coprocessor is provided, during manufacture, with the key (CSK) required to decrypt the software decryption key. Without further protection, however, this would authorize any coprocessor to run any software distributed in accordance with the preceding description; this would not meet the purposes of software authors. Therefore, the coprocessor requires further evidence of the user's right-to-execute; that evidence takes the form of an authentic (unused) hardware cartridge. If and only if the hardware cartridge meets the challenge of the coprocessor will the software decryption key be rendered effective. The coprocessor has available to it (by one of several alternative routes) what is referred to as token data. This token data can be coupled to the coprocessor in encrypted form so that the path by which the encrypted token data is made available to the coprocessor need not be secure. The token data is encrypted using the same software decryption key. The cartridge stores, in clear text form, the token data, and hence the hardware cartridge must be physically and logically secure. The coprocessor challenge to the hardware cartridge is in the form of a query, the hardware cartridge responds to the query by returning a reply which is a function of both the query and the token data. This function does not reveal enough about the token data to allow the behavior of an unused token to be reproduced. An example of such a function would be the selection of 50% of the token content on the basis of the query content. As the hardware cartridge generates the response, all the clear text token data which it had stored is overwritten or destroyed. As a result of the query/response process, the coprocessor receives the selected portion or transformation of the clear text token data. The process is arranged so that even though the communication path between the coprocessor and the hardware cartridge is not secure, someone monitoring the transaction (for example copying the query and the response) would still have insufficient information to simulate the behavior of the cartridge. While the coprocessor only receives the selected portion or a tranformation of the clear text token data, since the coprocessor also has available to it both the query and the entire clear text token data (having decrypted the encrypted token data), the coprocessor has available to it all the information it needs to determine whether or not the response identifies an authentic cartridge.

The communication path between coprocessor and hardware cartridge can either be direct (by coupling the hardware cartridge to a port in the coprocessor) or be indirect via the host or processor to be authorized.

A preferred example of a suitable query is a random number, of specified bit length. The query is input to the hardware cartridge and is used to select among distinctive and exclusive portions of the clear text token data as stored in the hardware cartridge. In a simple example the query can be binary so that if the clear text token data is divided into two portions, each bit of the query can be used to select a bit from the first or the second portion. A selected bit makes up one bit of the response, and simultaneously the selected and unselected bits are overwritten or otherwise erased. In this example then, the bit length of the query is equal to half the bit length of the clear text token data. Because the communication path between the coprocessor and the hardware cartridge is unsecured, it is assumed that a pirate will be able to copy the query and response. But the pirate is incapable of controlling the query another coprocessor will generate and therefore the response which he is aware of is insufficient to allow him to simulate the effect of an authentic hardware cartridge.

The software, the associated encrypted decryption key EAK and information respecting authorized transfer token(s) may be provided on a magnetic medium (floppy disk or tape). Alternatively, that information can be provided via a communication link (telephone line, CATV, etc.). The coprocessor which is employed in accordance with the method need not be permanently attached to or hardwired into the user computer system. However, in order to execute the protected software on the computer system, the computer system must be capable of communicating with the coprocessor. If the coprocessor does not yet store the software decryption key (AK), the coprocessor must also be associated with a transfer token so that the decryption key AK can be accepted by the coprocessor. The hardware cartridge containing the transfer token is arranged so that it is capable of authorizing an appropriate transfer of a decryption key AK on one and only one occasion. This assures that the user can transfer the software decryption key AK to a single coprocessor. Although the user may freely backup the software medium, the protected program can only be executed in cooperation with a coprocessor containing the software decryption key. Because the coprocessor is physically and logically secure, the stored software decryption key cannot be copied. Because the hardware cartridge containing the transfer token is both physically and logically secure it cannot be copied, and since the act of transferring the software encryption key causes the token information content to be altered or destroyed, this process can only be executed once.

As described above, the software distribution medium included information describing the token. This information is encrypted to protect it from exposure to unauthorized sources. However, as will be described below, it is not at all essential for the encrypted token description to be contained within or associated with the software distribution medium. It is an advantage if tokens are all unique. For a unique token description to be contained on each software distribution medium requires in effect that each software distribution medium be unique. It would be more advantageous if all software distribution media could be identical as this minimizes manufacturing costs. This can be achieved by providing the hardware cartridge with the means for storing the encrypted token data. All unique information can thus be isolated to the hardware cartridge.

As will be described below the transactions to be effected are varied in dependence on whether or not the encrypted token data is associated with the software distribution medium or the hardware cartridge containing the clear text token data.

In either case, the token will be tested by the coprocessor in such a way that the testing process (even though carried out via unsecured conductors) does not reveal sufficient token data to successfully forge the authorization which the token represents. To implement this process a "random" number is generated by the coprocessor (and retained by it for future use). The "random" number is used to interrogate the token which returns to the coprocessor that portion of the token data which is selected by the "random" number. At the cartridge, both the token data which is selected (and transferred to the coprocessor) as well as token data which is not selected is destroyed. In this fashion, even if the response of the hardware cartridge is recorded by unauthorized individuals, it is useless except in the limited situation where the coprocessor generates the identical "random" number or the forger guesses the required reply.

For a forger to fool another coprocessor by presenting that coprocessor with a forged reply to its random number query, either the second query must be identical to the first, or the forger must guess the correct response to the new query. Both of these can be made less likely by using longer queries. By combining good random number generation with sufficiently long queries to and replies from the token, the job of forgery can be made arbitrarily hard.

The coprocessor accepts the encrypted software key EAK from either the token cartridge or the software distribution media (preferred) and decrypts it using a coprocessor supervisor key CSK stored in the coprocessor at the time of manufacture.

The coprocessor then accepts the encrypted token data (from either the token cartridge or the software distribution medium) and, using the decrypted software key AK, decrypts the token data.

The coprocessor can then combine the "random" number and the clear text token data to determine the "correct" response of the hardware cartridge to its "random" number query. The "correct" response calculated by the coprocessor can then be compared with the actual response of the hardware cartridge, if they compare favorably, the right of the user to have use of the key AK has been established. This use does not include the ability to determine the actual content of AK.

In the event that the encrypted token data is not associated with the software distribution medium, it can instead be stored in a dedicated register in the hardware cartridge. The clear text token data is stored in a specialized register set which on reading will only provide a portion of the stored information where the provided information is selected by the response of the read components of the token on the basis of the selecting random number. These components may further transform the selected information using the part of the stored information which was not selected. Before or after the coprocessor has queried the hardware cartridge and received its response (the combination of "random number" and clear text token data), it can continue interrogating the hardware cartridge so as to read out the encrypted token data. Of course, this means that the encrypted form of the token data will be available to the user (and any unauthorized individual). But this no more undermines the security than having the encrypted token data on the software distribution medium where it too is available to the user and unauthorized individuals. It should be noted that the token contains no cryptographic keys. If the coprocessor is considered to be a trusted receiver of secret information (AKs) then the token can be likened to a wax seal on an envelope which assures the receiver that no other receiver has accepted that message (an AK). The token, thus gives the software vendor control over the total number of coprocessors that are able to execute their software. It is this control which is absent at present and allows software piracy to exist.

It should be clear that this system's solution to the piracy problem is based on amending both the personal computer and the floppy disk by the addition of a hardware component which compensates for the exposures that allow piracy. In the case of the personal computer, that exposure is the availability of the complete address and register space of the computing system to user scrutiny and command. In the case of the floppy disk (or any other distribution or storage media) it is the fact that a functional reproduction of the media can be made. It is possible to describe the amendments in a manner which makes the applicability of this system to computing systems other than personal computers clearer.

The openness of the existing computing system is addressed by the addition of a coprocessing system. This system is needed to implement two levels of privilege above that of the user of the system. This is necessary even in the case that the computing system has a CPU which implements privilege. In such a system, some user is still responsible for loading the operating system and could provide an operating system which supports his access to protected portions of the vendor's code. Even if the operating system were burned in ROM in the CPU, the user would not be denied physical access to the protected code.

The privilege structure dictated by this problem is thus a branch on whatever structure is already present. This branch contains two levels which are effectively parallel and separate from the existing structure. The two levels of privilege which are added to the computer by the coprocessor (or are designed appropriately into the computing system) have distinct functions. The lowest of the two levels provides a space in which a portion of the vendor's code can be executed as a service for the part of the vendor's code executing in the open memory of the host computer. The higher level of privilege in the branch is used to perform the secure transactions which prevent proliferation of the rights-to-execute when they are installed or used. These transactions are available as a service to the lower level of privilege or the host.

This architectural extension of present computing systems provides support for data processing security functions in general by providing means for the trustworthy execution of software. The changed privilege structure provides an execution space in which the software provider has a privilege greater than the system user. This privilege level is parallel to, but distinct from, the system operator. At this privilege level the software provider may execute his product as a service to the user without giving access to it as a software object. This software is then trustworthy in the sense that it cannot be changed or observed by the user, but only accessed as a service. The uses of such trustworthy execution will be obvious to those skilled in the system security area.

A second level of privilege is provided as part of this additional privilege structure. It is the responsibility of this level of privilege to control the operations needed to cause the software product to execute. This level of privilege is trustworthy in the sense it will only allow execution of code if it has been given the right to execute by the software provider. This level of privilege has the additional job of isolating applications executed at the lower level in the event that multiple programs are executed there. This is a classical operating system function and is necessary to keep code at the lower level trustworthy.

In accordance with this aspect, the invention provides a method of securing protected software against unauthorized use without perturbing existing channels of software distribution and, at the same time, not interfering in user's creation of unlimited backup copies of protected software, said method comprising the steps of:

(a) providing to a user a physically secure coprocessor and coupling said coprocessor to a user host computer to support bidirectional communication therebetween to create a composite computing system including said host computer and said coprocessor, (b) providing logical security to said coprocessor by:
(1) providing a first privilege level including first level secure memory and first level operating instructions, secured against access or variation by said user, for executing protected software,
(2) providing a second privilege level including second level secure memory and second level operating instructions, secured against access or variation by said user or any author of protected software, for controlling authorization for execution of said protected software by said first privilege level, (c) distributing protected software in a form in which at least a portion is inexecutable by said host computer but which is executable by said coprocessor but only with authorization by said second privilege level, (d) distributing a further tangible element distinct from said protected software representing a right to execute said protected software, (e) providing said composite computing system access to said protected software and to said further tangible element, (f) verifying authenticity of said further tangible element by said coprocessor at said second privilege level, (g) altering said second level secure memory in a distinctive fashion to reflect a determination by said second privilege level of authenticity of said tangible element, and (h) executing said protected software so long as said alteration of said second privilege level secure memory is detected and denying said request if said alteration is not present.

From the preceding it should be apparent that the first privilege level has the function of executing protected software as a service to the software vendor and to the user, but protecting that software from access by the user. The second privilege level includes the key management functions of acquiring a right to execute and, once acquired, copying the necessary decryption key into the secure memory space (second privilege level) of the coprocessor. As distributed, of course, the protected software is inexecutable by the host computer since at least a portion is encrypted; the software is executable by the coprocessor once it has authorization by the second privilege level. The further tangible element is the hardware cartridge storing the transfer token. The manner by which the coprocessor verifies the authenticity of the transfer token has already been described in detail. The alteration to the second level secure memory is the writing therein of the software decryption key. Whenever execution of the protected software is requested by the user, access is made, via the coprocessor's second privilege level to the secure memory space to determine if the appropriate software decryption key is present; if present, the coprocessor initiates decryption of the protected software and storage of that software in the coprocessor's first level secure memory space. Subsequently, the second privilege level authorizes execution by the first privilege level. Of course, if the necessary software decryption key is not present, the user's request to execute the software is denied.

BRIEF DESCRIPTION OF THE DRAWINGS

The invention will now be described in such detail to enable those skilled in the art to practice the same when taken in conjunction with the attached drawings in which like reference characters identify identical apparatus and in which:

FIG. 3 illustrates the components of a distributable software set in accordance with one embodiment of the invention;

FIG. 4 illustrates how the distributable components are created by the software vendor;

DETAILED DESCRIPTION OF PREFERRED EMBODIMENTS

Figure 1:
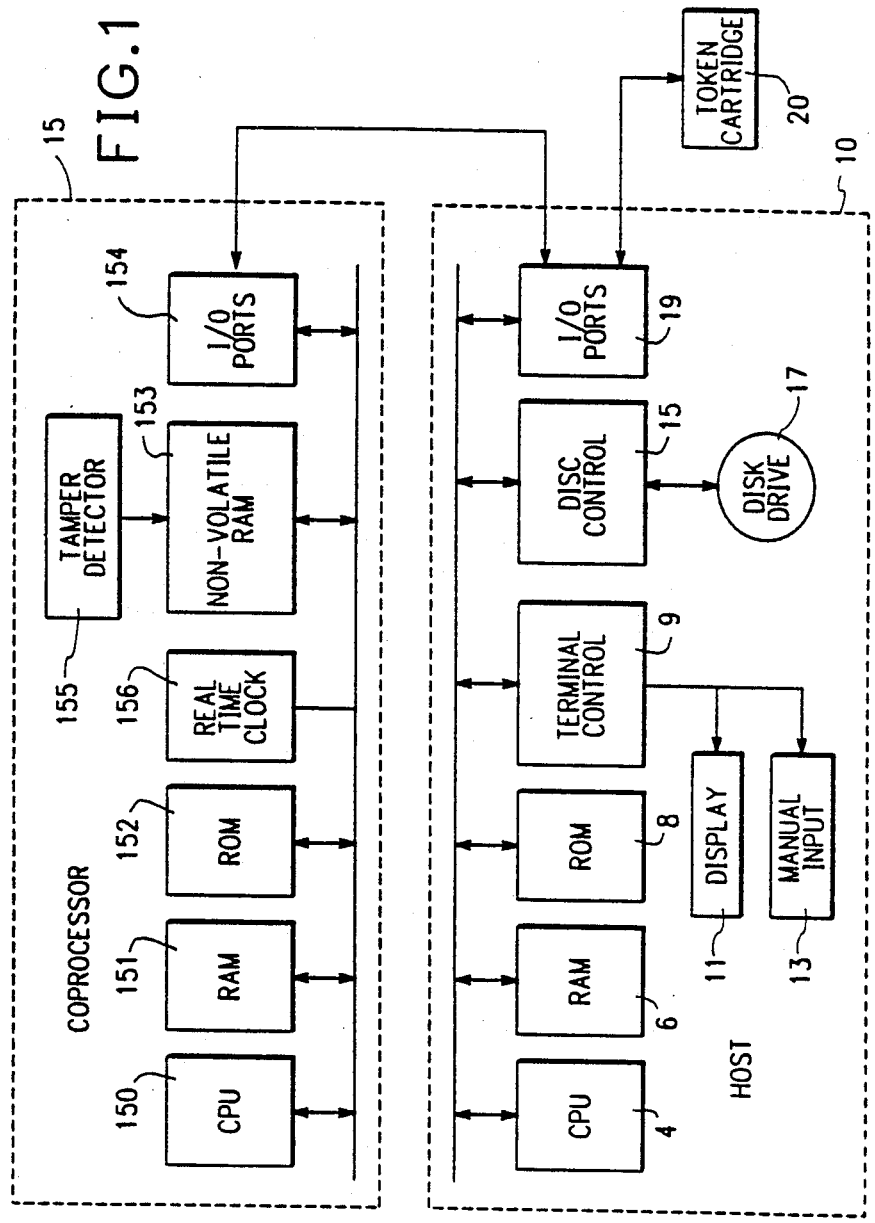
FIG. 1 is a block diagram showing major components of the host computer 10 and the coprocessor 15.

As described in the above referenced U.S. Pat. No. 4,644,493, the term Personal Computer, or single user system for individual work station, as applied to a class of small computers can be misleading. These systems are more properly termed Single Operator Systems. From the point of view of classical operating systems, this places the user-operator in a position of trust in which he has access to all of the system code and system facilities. In common Single Operator Systems, this exposure of system code and system hardware facilities is an opportunity to replicate and re-distribute code, which on a classical large computing system with separate operators and users, would be unavailable. The means by which this security is achieved on large systems is the implementation of a system in which users are given a privileged status level which is tested by the system to determine whether or not the user may execute certain instructions or access certain data for reading or modification.

It is the purpose of the present invention, in common with a purpose of the invention of the above referenced U.S. Pat. No. 4,644,493 to teach how a system utilizing privilege may be implemented on Single Operator Systems to the advantage of the hardware manufacture, the software vendor, and the scrupulous Single Operator System User. This is referred to as a "Shared Higher Level of Privilege System" because it can be viewed as providing each software vendor with a higher privilege level than the user, without giving any vendor access to other vendors' privileged information. By using this system, a portion of hardware and software of the system is hidden in a coprocessor sub-system which is installed or connected to Single Operator System (also referred to as the host or work station) so that some portion of the vendor software can be made inaccessible to the user except as a service. In addition the method for transporting software either on some magnetic media (floppy disk or tape) or via a communication link allows the software vendor to cryptographically hide some fraction of the software from the user in spite of the user being able to examine it with the resources available to him on the system.

For purpose of this description the host hardware or work station is assumed to be IBM Personal Computer (PC) the operation of which is described in the IBM Personal Computer technical reference manual, 1981, the host disk operating system (DOS) is assumed to be IBM PC DOS. This assumption is for the sake of clarity because the operation in DOS services of this combination are typical of a class of machines in which this invention is useful. It should be understood that these DOS and hardware operations are intended to be representative of all the analogous operations on this or other possible host systems (including main frame computers) under this or other operating systems.

A software copy protection system in accordance with the invention employing shared higher level of privilege is composed of two parts; the hardware privilege support system (a coprocessor) which is installed in or coupled to the work station, and the medium (magnetic or otherwise) which is used to transport the software from the vendor to the user. As will be described the form in which the software is communicated makes it easily copied for backup purposes. In order to obtain a coprocessor's future cooperation in executing the software, however, the software must at the first use be presented to the coprocessor with a token. The token cartridge can effectively be used only once and is very resistant to forgery. Copies of the magnetic media are useless for conveying the ability to execute the software package. Use of a token gives authorization to the coprocessor to accept a decryption key AK so that the software can be executed on the PC (or host) in conjunction with this particular coprocessor. Other coprocessors which have been authorized to use the same key may also execute the software. When the token cartridge is used, it becomes incapable of conveying subsequent authorizations. The software vendor is thus provided with the means for controlling the number of authorized systems without the need for two way communication with the systems.

The application software must consist of at least one file of encrypted program. This part of the application software is encrypted with a key (AK) provided by the software vendor. The software key (AK) is supplied to the user in encrypted form (EAK), encrypted under a key (CSK) known only to the hardware vendor. The decryption key (CSK) for that encrypted software key EAK is supplied by the hardware vendor in the secure memory of the coprocessor. Encryption of an AK to produce an EAK is carried out in such a way that the hardware vendor's encryption key (CSK) is not available to the software vendor. It is in the best interest of the software vendor to encrypt those fractions of the application software which he considers proprietary, as it is the encrypted fraction of the software which will be protected from redistribution by the user.

In the event that the software is to be distributed by a magnetic medium (floppy disk or tape) then that medium which is ready to be sold or released may consist of the following (see FIG. 3):

1. An application which consists of at least one file of program encrypted with a key AK selected by the software vendor.

2. The decryption key AK needed to render the encrypted software executable provided in encrypted form EAK where the encryption is by the hardware vendor's (secret) encryption key CSK.

3. Token data TD which is in encrypted form, ETD encrypted with the same software vendor key (AK) which is used to encrypt the encrypted portion of the application.

As will be described below encryption of the software decryption key is carried out by the use of a coprocessor which may in all respects be identical to the coprocessor which is operated in conjunction with the PC. Because of the characteristic of the coprocessor, the software vendor who employs this equipment does not have access to the information (hardware vendor's encryption key CSK) stored therein.

As will be described below the software may also be distributed via a communication link, so long as the package of information which is transmitted to a host includes the components enumerated above.

It is a characteristic of the invention that the method cannot be defeated by duplication of the software and attempting to execute the information enumerated above, whether or not it is executed on a host which is or is not coupled to a coprocessor unless that coprocessor has received authorization to execute that software.

If a pirate wanted to make copies of the enumerated information which will operate on systems which are coupled to the coprocessor he must somehow provide for the transfer from the distribution medium to the coprocessor permanent storage of the software decryption key. However, as will be described below, this transfer requires token data from a use-once- hardware-cartridge and, as will be described, the hardware cartridge can be arranged so that it is arbitrarily difficult to duplicate or forge. In the absence of an appropriate token cartridge, the coprocessor will not accept the transfer of the AK which is necessary to run the protected program. Thus piracy by copying the information that is distributed is inhibited by the difficulty in duplicating or forging the behavior of an authorizing token cartridge.

If the pirate wishes to make a copy of the distributed information which will run on systems without the coprocessor, then he must first decrypt those parts of the application program which have been encrypted. Since there are two processors in coprocessor equipped systems, it is possible that the application may be written to operate concurrently on two processors, or use special facilities on the coprocessor. If so, the application must be drastically modified to be operational. Piracy by copying a decrypted version of the application is thus inhibited by strength of the encryption method used to render the application unreadable. It is practical to make this a virtually insurmountable task. Even if this were accomplished, the software could still be useless unless it were rewritten to run without coprocessor.

In order for the copy protection system to be effective, it is necessary not only that no copy can be made of the distribution information which will convey authorization to accept AK into another coprocessor, but also that the software must never reside in system memory in a form which allows the user to make a binary image of the system memory with a complete working version of the application which could be loaded in other systems.

It is also desirable that the user must be able to make unlimited quantities of backup copies of the software for which the user's coprocessor is authorized, all of which are useless on unauthorized systems.

These are features of this protection system and are supported by the coprocessor. The coprocessor is itself a computing system. It has it own processor, firmware and read only memory (ROM), a real time clock and RAM. It could be installed in a personal computer as an adapter card set mapped into the memory and I/O address space, or it could merely be coupled to a personal computer via an I/O port. It should be noted that it is a feature of the present invention, as contrasted with the in the above referenced U.S. Pat. No. 4,644,493, that the coprocessor is portable. The coprocessor communicates with the PC in one of two different fashions. If the coprocessor is directly installed (such as a card set) in a PC, then it can communicate with the PC through a region of common memory and through a set of registers which reside in the port address space of the PC. In this version the common memory is part of the coprocessor. The coprocessor controls its bus transceivers and can cause the common memory to be unavailable to the PC for read operations. (This architecture is described in our co-pending U.S. Pat. No. 4,644,493, filed Sept. 14, 1984.) In the alternative, the coprocessor can communicate with the PC through an I/O port. Regardless of the manner in which such communication is effected, it is necessary that only a portion of the coprocessor memory be addressable by the PC. It is also necessary that the portion of the coprocessor memory which is not addressable by the PC be physically inaccessible to the user. It is this memory in which the coprocessor will decrypt and run the encrypted portion of the application software.

In addition to the processor, memory (RAM and ROM) and port address registers (if any) the coprocessor has physically and logically secure memory space which contains ROM and non-volatile memory devices (such as battery backed CMOS RAM or EEPROMs).

The ROM contains the system firmware. It is in the form of a monitor whose commands are the services which the PC may request from the coprocessor. A complete set of such services would include as a minimum set:

1. Acquire a Right-to-Execute (ARE).
2. Load, decrypt, and run application (LDR).

The non-volatile RAM device is used by the coprocessor as a secure non-volatile memory in which decryption keys AK1, AK2, etc. of initialized applications are stored along with all CSKs.

It should be understood that the coprocessor must have at least two levels of privilege so that the memory used to store AKs can be properly secured from the user. This is needed because the user could be a writer-of-software. If the software executed on behalf of one author could read the AKs of other authors, the user-authors could recover other authors' AKs and decrypt their protected software. Management of installation, use of, and access to AKs should be understood to be important functions of the higher level of privilege to the system.

All application software decrypted and run on the coprocessor is at a lower level of privilege than the ROM resident firmware which controls non-volatile RAM access and, loading, decrypting, and starting of protected software.

As noted earlier, the coprocessor must be physically as well as logically secure. This security is required in order to prevent the user from applying logic analyzers or other digital control and recording devices to gain a record of the content of the secure memory space and hence the AKs or decrypted software. A suitable packaging for the coprocessor is described in applicants co-pending application Ser. No. 927,309, filed Nov. 5, 1986, the disclosure of which is incorporated by this reference.

The PC or individual work station is a common single bus micro-processor system. The IBM PC is typical of this class of machines. Such a system uses the bus (which can be an array of transmission lines with sockets at intervals) as a communication medium between logically separate sub-systems. Some of the sub-systems may reside on the same packaging element (in this case a printed circuit board called the "System Board") that supports the bus. Sub-systems which are necessary to the function of the system or offer expansion of the function of the system are handled by attachments to the bus through the sockets. It should be noted that the components which constitute a sub-system may be made so that parts of the sub-system may reside on different packaging elements.

The complement of sub-systems which are shown in FIG. 1 in the region labeled host, as indicated at 10, is an example of a common, nearly minimal, PC. The PC CPU 4 is a single chip micro-processor and a group of support chips. The PC CPU 4 is supplied with a periodic signal called the clock and with connection to the bus by the support chips. The micro-processor is commonly supplied with more support than this, but all support is aimed at executing a repeating cycle of fetches of instructions from memory, fetches of data from some selected element of the sub-systems (such as Random Access Memory), execution of instructions, and when needed, storage of resulting data in an selected element of the system. The CPU 4 may have support supplied to it called direct memory access (DMA) which allows the micro-processor to be relieved of tasks which involve the movement of data from one addressable element to another.

The micro-processor controls the type of bus operation performed (fetch, store, etc.) and the type of element selected (RAM, Port Address Register, etc.) by which of the controls lines in the bus is "asserted" (changed to the appropriate potential according to a protocol called the bus definition). By these means, the micro-processor is able to obtain a collection of instruction (called the program), execute the instruction on a set of data, and cause the data stored in other elements of the system to change as a consequence of the execution of the instructions.

The RAM 6 is a sub-system from which data can be fetched from and written to by the CPU 4. It is the sub-system used to store data and instruction which are loaded from some other source. If it has meaningful content, then that content has been written to it by the CPU 4. At the time that the computer is powered on, the RAM 6 contents are, for practical purposes, meaningless.

The ROM 8 is a sub-system from which data can only be fetched. It may contain a collection of programs which are needed to start useful operation of the computer and which are useful for controlling the remaining sub-systems.

The remaining sub-systems, terminal control unit 9, display 11, manual input device 13, disk system control unit 15, disk drive 17 and I/O port 19 can be characterized as having or supporting both addressable elements and mechanical, optical or electro-magnetic (or other) elements which can affect human senses, be affected by human actions, or manipulate a magnetic medium to perform read and write operations involving creating and sensing the boundary between magnetic domains on the magnetic medium. The contents of some of the addressable elements control the actions of the mechanical, optical, and electro-magnetic effectors of the sub-system, and the contents of other addressable elements are controlled by the mechanical, optical or electro-magnetic elements. Thus, by these means, it is possible for the computer system to interact with the user and with magnetic and other media. The sub-system which provides the elements needed to interact with the user is called the terminal control sub-system. The common form of sub-system which allow read and write operations on magnetic medium are called disk control systems. Given these elements it is possible to describe in broad outline, the operation of such systems.

At the time of power up, the micro-processor executes an instruction fetch from a fixed location in memory. This address is one which is occupied by the ROM 8. The instruction in that location is a jump to the programs which have the effect of testing and initializing the system for use. One of the system initialization programs causes a program called the Disk Operating System (DOS) to be read from a disk and executed. This program (the DOS) is able to accept commands from the user through the use of the terminal control system. These commands include causing a program chosen by the user to execute on the system by naming the file (using the manual input) in which the program resides to the DOS program.

The complement of sub-systems which are shown in FIG. 1, as indicated at 15 is an example of a minimal coprocessor system. The elements of the hardware may be thought of as consisting of two parts. One part (at 154) contains addressable elements which allow the hardware to communicate with the PC so that commands and data may be exchanged (much as between a user and the host system). The other parts contain the coprocessor CPU 150, RAM 151, ROM 152 real time clock 156 and non-volatile RAM 153, not concerned directly with communicating with the PC.

The non-volatile RAM 153 may be implemented as EEPROM or as battery backed CMOS RAM or in any other technology which allows erasure of that memory's contents.

The combination of properties, non-volatility and eraseability are needed so that the software keys (AK's) and coprocessor supervisor keys (CSK) can be retained between uses of the coprocessor, but can be erased in the event that physical intrusion detection system 155 detects a tampering attempt; see copending application Ser. No. 927,309 for an example of such a system.

A real time clock 156 is a sub-system which contains a specialized counter. It is supplied with power by a battery, typically the same battery as is used to power the nonvolatile memory and the tamper detector. The battery supplies power to the counter and its support chips during the period when the computing system is turned off. The counter increments its registers in response to clock signals generated by its support chips so that its registers reflect the interval of time since the registers were initialized by the coprocessor manufacturer. Thus, if the registers were initialized to the time of day, then their contents would approximately track the time of day. The registers of the real time clock can be read by the CPU 150.

FIG. 1 shows a configuration of the PC and associated coprocessor by which software distributed in accordance with the invention can be executed. For purposes of this description we will assume that the software is distributed on magnetic media such as a floppy disk, although as the description proceeds it will become apparent that the software may be distributed by any conventional technique. While in accordance invention described in the referenced U.S. Pat. No. 4,644,493 the Support Hardware communicated with the host through its internal bus, it is a feature of the present invention that the coprocessor can be coupled to the PC through a communication port, so that the coprocessor can be conveniently portable. We will describe operation of the system using this configuration although it should be apparent that the present invention can also be employed when the coprocessor communicates to the PC through an internal bus.

The coprocessor 15 has some features in common with the Support Hardware of our referenced U.S. Pat. No. 4,644,493. More particularly, the coprocessor provides each software vendor with an instance of a higher privilege level than the user but at the same time does not give any software vendor access to other vendors' privileged information. All application software decrypted and run on the coprocessor is at the lower of the two privilege levels; the higher privilege level, implemented in the ROM resident firmware, controls access to the non-volatile RAM 153, loading, decrypting and running operations. This structure in the coprocessor prevents a software vendor from writing a monitor which would run on the coprocessor to access the firmware and non-volatile memory (including the decryption keys) and make that information available to the host 10.

Accordingly, the coprocessor 15 has a first or lower privilege level which has access to the RAM 151; as already described, the RAM 151 is secured from the user and/or the host 10. The first privilege level includes first level operating instructions for executing protected software. The coprocessor 15, however, also has defined a second privilege level including a second level secure memory and second level operating instructions. The second level secure memory is represented by the non-volatile RAM 153 and the second level operating instructions are defined in the ROM 152. The second privilege level is secured both against the user and any software author. It is the second privilege level of the coprocessor 15 which is involved in acquisition of rights to execute and therefore controls the procedures antecedent thereto. The same second privilege level also responds to user requests for execution of protected software, provides for the loading and decryption of protected software and initiating the first privilege level into operation for execution of the protected software, but only in the event that the second privilege level determines that such execution is authorized.

There are, in accordance with the present invention, two modes of operating on or with protected software, a first mode called Acquire Right-to-Execute (ARE) is required to authorize the coprocessor to execute the protected application. Each coprocessor may be authorized to execute many software applications by performing the ARE transaction for each application. Thereafter, when the apparatus executes a software package for which it is authorized, it operates in a Load, Decrypt and Run (LDR) mode.

FIG. 3 describes a software configuration which is employed in accordance with the present invention. As shown in FIG. 3 the three files may be distributed as unit (either on a magnetic medium or via a communication link). A first file is an encrypted software decryption key EAK. The second file is the software which includes both plain text software (PART 1) and protected or encrypted software (PART 2) (EAK (Software, Part 2)). The last file is encrypted token data EAK(TOKEN DATA). While the encrypted software and encrypted token data are encrypted using a common key (AK), such that each of them can be decrypted using the decryption key (AK), the software decryption key is encrypted with a different key (CSK); the hardware vendor's key which, as will be described, can be maintained secret from the software vendor. While in accordance with the invention described in the previous U.S. Pat. No. 4,644,493, a key pair using a "public key" cryptographic system must be used to encrypt and decrypt the software key, it is a feature of this system that any adequately secure cryptographic system may be used including DES or other "symmetric" key systems in which the same key is used for encryption and decryption.

For purposes of this description we will assume that the three files of FIG. 3 are contained in floppy disk which is loaded in the disk drive 17. In order to initialize the coprocessor, a token cartridge 20 is coupled to the coprocessor 15 or to the host PC 10. The cartridge 20 includes token data stored in a memory device which has unique characteristics as will be described below. At this point it suffices to note that the cartridge 20 is arranged so that it can be used on a single occasion; the act of employing the cartridge 20 alters it such that it is no longer usable for its intended purpose.

In order to employ the (protected) software the coprocessor 15 must be provided with the decryption key (AK) which is needed to render the encrypted portion of the application executable. This key will be transferred to the software owners coprocessor 15 in such a way that the transfer mechanism cannot be reused or reproduced. This is accomplished by requiring the presence of an unused token cartridge to effectively transfer the decryption key into the nonvolatile memory of the coprocessor 15. "Unused" in this context means only that the content of the token cartridge supplied by the software author has not been read by any means prior to this occasion. As noted the token is difficult to forge for reasons which are discussed later and is effectively erased in the transfer transaction. The token has information content which is identifiable to the coprocessor 15 either because it is enumerated in an encrypted file associated with the program (or alternatively provided by another source, as described below). The enumeration evidences the fact that this has been provided by the software author. It is authenticated to the coprocessor 15 by the fact that the information is encrypted with the same key (AK) which the software vendor has used to encrypt the protected portion of the application.

The cartridge 20, storing the transfer token is coupled to the I/O device 154 of the coprocessor (not illustrated) or the I/O device 19 of the PC (as illustrated) via a connector provided for that purpose. Since the connector to the cartridge 20 is exposed, and can therefore be monitored by the user, the transaction which uses the connector must be difficult to forge given that some of the data will be exposed. To have this property, each transaction should be effectively unique and verifiable by the coprocessor.

Figure 2:
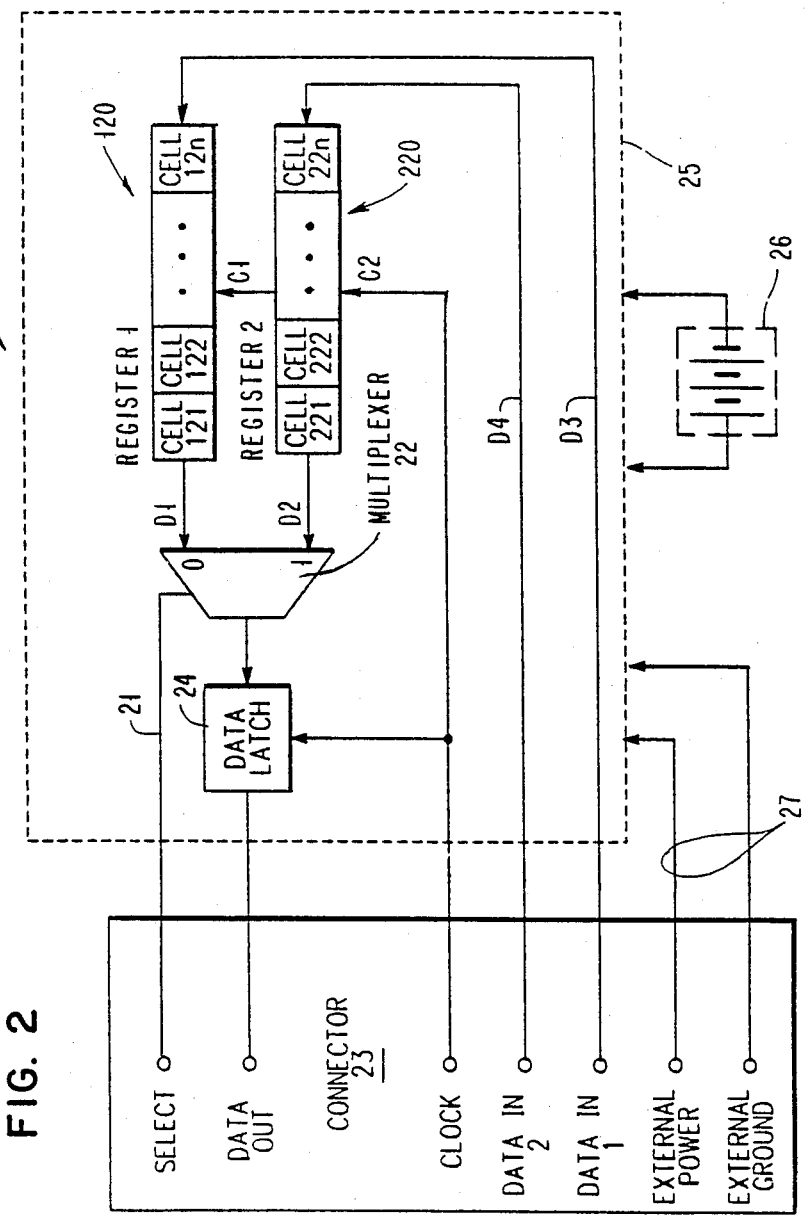
FIG. 2 is a block diagram of the hardware cartridge 20 and its association with a suitable connector 23, either from the I/O port 154 of the coprocessor 15 or the I/O port 19 of the host 10.

The cartridge 20 is both physically and logically secure. Physical security may be provided in a number of fashions, one of those fashions is described in the applicants co-pending application Ser. No. 927,309, filed Nov. 5, 1986. A preferable method of physical security is to implement the circuitry of the token as a single integrated circuit chip. The cartridge 20 includes memory which behaves in such a fashion which allows verification of no-prior-use as well as verification of its authenticity. Both verifications are needed by the coprocessor before the decryption key AK will be accepted for future use. As will be described below the cartridge 20 may be manufactured by a third party source so long as its connector and protocol are standardized. Its information content must be determined and loaded by the software author or the author's representative. Data is transferred from the cartridge to the coprocessor using a query/response protocol. The query is a random number, and it in combination with the token data determines the token response. The accessible information passing on the unsecured path between coprocessor 15 and cartridge 20 is the "random number" and the response of the cartridge, neither of which reveals the token data. The coprocessor has access to a copy of the token data (for example by decrypting the encrypted token data from the software distribution media). Thus the coprocessor can independently determine the "correct" response, and can compare the actual response from the cartridge 20 with its own, independently determined "correct" response. Thus only the random query and the actual response are exposed during the transaction. The complete token information needed to combine with the query to obtain the response is not revealed. At the same time as the cartridge 20 produces its response, it also alters its contents so the cartridge cannot be reused. This is accomplished by providing a region of memory in cartridge 20 which does not behave as if it were a normal memory under read operation. (A block diagram with suitable architecture for the cartridge 20 is shown in FIG. 2). Briefly, the cartridge 20 includes at least two memory segments, both of which can be written to as if they were conventional serial input shift registers. When a read is performed, however, the access properties of the regions changes. During reads both memory segments are enabled and produce data at an output as would a normal serial output shift register. Both the outputs are sent to a multiplexer. The multiplexer selects which of the two (or more) segment's data to route to the connector (and thus to the coprocessor) by the state of a control line which is contained within the connector, and which is driven by the coprocessor with the "random number". When the memory region of the cartridge is read out, the contents in both segments are erased. This ensures that a pirate observing the transaction between the coprocessor and the token cartridge can only obtain a portion of the information content of the cartridge. This portion of the token information is sufficient to verify to the coprocessor that it is a valid token which can authorize the coprocessor to use the software package but it is far from sufficient to allow a pirate to reconstruct its original content in order to fool other coprocessor into accepting a key which is not rightfully owned.

In an embodiment of the cartridge 20 which was described above, two shift registers are employed, so that during a read, the selected 50% of the memory contents are exposed. In alternative versions larger memory segments, or larger granularity of selection than a bit, or using addressable stored data to respond to queries are suggested techniques. These variations offer trade-offs to the system designer concerned with cost versus security.

During this read operation a portion of the contents of the cartridge 20 is transferred to the coprocessor. The portions which are selected are determined by a "random" number generated by the coprocessor. Both the "random" number as well as the response from the cartridge 20 are then stored in the coprocessor. This information can then be compared with the token data (file 3-FIG. 3) which is also transferred to the coprocessor from the software distribution medium. Failure of the token data to correspond to the expected token data is taken as proof of forgery of the token cartridge and results in rejection by the coprocessor of the decryption key for future use, and of course only if the decryption key is accepted for future use can the protected software be executed.

FIG. 2 is a block diagram of one embodiment of cartridge 20. In this embodiment the token device is implemented as a single silicon CMOS integrated circuit chip 25 for cost and physical security reasons. This chip is appropriately packaged so that the data storage elements 120, 220 are continuously powered by a battery 26. CMOS integrated circuits can be built with static power requirements so small that the data stored in these registers, if not read out, can be expected to be preserved for a period almost equal to the shelf life of the battery. In the case that the data is read, as will be described, the other components needed to affect reading are supplied with power from an external source through the external power and ground lines 27. As shown in FIG. 2 the cartridge 20 is coupled to the coprocessor or the host PC via connector 23 having Clock, Selection, Data Input, Data Output, External Power and External Ground lines. The cartridge 20 contains two memory segments in the form of Serial In, Serial Out, Shift Left, Shift Registers 120, 220, a first segment including cells 121-12n and a second segment including cells 221-22n. Shift registers of this kind have the property that the state of the bit stored in their left-most cells (121, 221) is reflected in the state of their output lines (D1, D2). They have the additional properties that when the falling edge of a clock pulse is presented at their clock lines (C1, C2) the state of each cell is changed to that of the cell to its immediate right so that the pattern of bits in the register is shifted to the left. In the case of the right-most cells (12n, 22n) the falling edge of the clock pulse caused these cells to assume the state of the data input lines (D3, D4). The cells can be filled with data by supplying a data bit at each of the two data input lines and then supplying a clock pulse. If this procedure is repeated for n clock pulses, then all n bits of the registers will be filled. An encrypted (under AK) copy of these bits could then be made and stored on a floppy disk to supply the encrypted description of the token data. This procedure is followed by a software author to prepare the authorization to a coprocessor to accept an AK.

When a read operation is performed, each bit of the coprocessor generated random number is placed consecutively on the select line. Each setting of the select line 21 is followed by a clock pulse. Both shift registers will shift left on each clock pulse. Data from the first shift register is placed on the line D1 and from the second shift register on the line D2; both of which are inputs to a multiplexer 22 which is in turn controlled by the select line 21 from the coprocessor or host PC. The select line 21 determines which of the two signals D1 or D2 are coupled through the latch 24 to the output DATA. The latch is used to prevent a pirate from obtaining the token data by changing the select twice for each clock pulse. The consequence of this arrangement is that for each bit which is presented at the data out, two bits have been shifted out of the registers, and two bits, which are useless for authorization, have been shifted in.

Accordingly, and assuming that the entire memory contents of the cartridge 20 were read out, one observing the input to the select line 21 and DATA output, would only observe, at most, 50% of the contents of the cartridge 20. The coprocessor knows from the Encrypted token information exactly what bits should have appeared in that 50% so it has sufficient information to confirm the validity of that authorization, but a pirate lacking the destroyed 50% will not be able to forge an authorization.

When the coprocessor 15 is requested to acquire an AK (ARE), a process (see FIG. 5) is initiated. This begins when the encrypted software decryption key (file 1) and encrypted token data (file 3) are read into the RAM 151 or temporary memory 15T. In addition, a "random" number (3) is generated by the coprocessor and used in performing a read operation on the cartridge 20 as previously described. The "random" number is used to select which bits of which memory segments will be effective to pass the multiplexer 22. The coprocessor 15 stores the "random" number in RAM 151 along with the resulting DATA (4) from the cartridge 20.

It should be understood by those skilled in the art that there are a very large number of variations on the design of the token cartridge. All have the properties that the data read from the cartridge is transformed as a function of both the query bits and the token data content and that the resulting reply from the token is predictable if the complete content of the token is known.

The coprocessor decrypts the software decryption key ECSK(AK) and the resulting software decryption key (AK) is used to decrypt the token data to produce clear text token data. In the case that there are multiple CSKs, the encrypted software key could be supplied with a reference to the correct CSK in a header. Such headers could provide an index to the correct CSK in plain text or a recognition flag which decrypts to an expected pattern only if the correct CSK is used. Many other methods are possible. Having decrypted EAK with the correct CSK, the coprocessor can then combine the stored "random" number or query with the clear text token data and independently determine the "correct" response. The actual response (the DATA received from the cartridge 20) can then be compared to the "correct" response. If the two quantities compare favorably that is taken as an indication that the cartridge 20 authorizes the coprocessor to store AK (5) in nonvolatile RAM or permanent memory 15P for future use. The user can now successfully request that the coprocessor execute the software protected by the newly acquired AK. It should be noted that the key AK may be re-encrypted by the processor prior to storage. This step of re-encryption could provide improved protection of the stored key or could, if used correctly, support storage of the key outside the coprocessor.

On the other hand, if the "correct" and actual response of the cartridge do not compare favorably, the software decryption key (AK) is discarded and the coprocessor is unable to properly execute the encrypted software wherefore the application program will not run properly.

It should also be apparent that this transaction destroys the contents of the cartridge 20 (see FIG. 6) so that it cannot be reused to authorize any other coprocessor to run the application, or any other application program.

The enormous number of possible selections of the contents of the different segments of the cartridge that can be made by the coprocessor and the amount of information in which the pirate must reconstruct by trial and error are the barriers to the pirate's successful reconstruction of the cartridge 20. The probability of successful forgery (P (Forgery)) is a function of the probability that the coprocessor will ask for the same selection at any given bit of the request (P (same)), the probability that the pirate will guess the "lost" data of an observed transaction correctly (P (guess)), and the number of bits requested by the coprocessor in the validation transactions (Numbits). P(forgery)=(P(same)+(1- P(same))(P(guess))) to the power Numbits. If P(same)=0.5 and P(guess)=0.5 and Numbits=128 as could easily be achieved in practice with a small integrated chip, then P(forgery) is approximately ten to the −16th power. If the rate of which a pirate would test his guesses is once per second, then even such a small cartridge would force a search lasting, on an average, more than two hundred million years. The coprocessor is, thus, able to determine reliably whether or not the cartridge it is reading was supplied by the software vendor to validate ownership or is a forgery, without exposing the information needed to create a successful forgery. The coprocessor will only store a decryption key (AK) for later use after the cartridge has been verified.

FIG. 4 shows how the software vendor can construct a distributable software product, to be distributed on a magnetic medium or via communication link. The software vendor begins with three components,
  A. The application software,
  B. A software decryption key AK (known to the software vendor only), and
  C. Token data (a random number, known to the software vendor only).

The software vendor, in a first function (F1), uses his own (secret) encryption key AK to encrypt the token data as well as critical parts (part 2) of the application software. The result of this encryption process becomes the encrypted token data [$E_{AK}$(TOKEN DATA)] which will be distributed and the encrypted application software [$E_{AK}$(Software)].

The noncritical parts of the application software (part 1) forms another component of the distributable software product.

Finally, the software decryption key (AK) is encrypted in a function F2, using the hardware vendor encryption CSK. The result of this process is the encrypted key [$E_{CSK}$(AK)] forms the last component of the distributable software product.

FIG. 4 shows that function F2 is enclosed in a double rectangle to indicate that the encryption process takes place in the software vendor's coprocessor so that the hardware vendor's encryption key (which is contained in the coprocessor) is unknown to the software vendor.

In this fashion, the software vendor is prevented from acquiring knowledge of the hardware vendor's encryption keys. Software vendors can choose which hardware vendor's coprocessors they are willing to allow their keys to be installed on by preparing Encrypted Software Keys (EAKs) only with the coprocessors provided by trusted manufacturers. It is clearly in the best interests of the trusted hardware manufacturers not to destroy the effectiveness of their own product by revealing their own CSKs or using their own CSKs to reveal the software vendor's AKs. Accordingly, no "secret" data need be shared between the software and hardware vendor.

Figure 5:
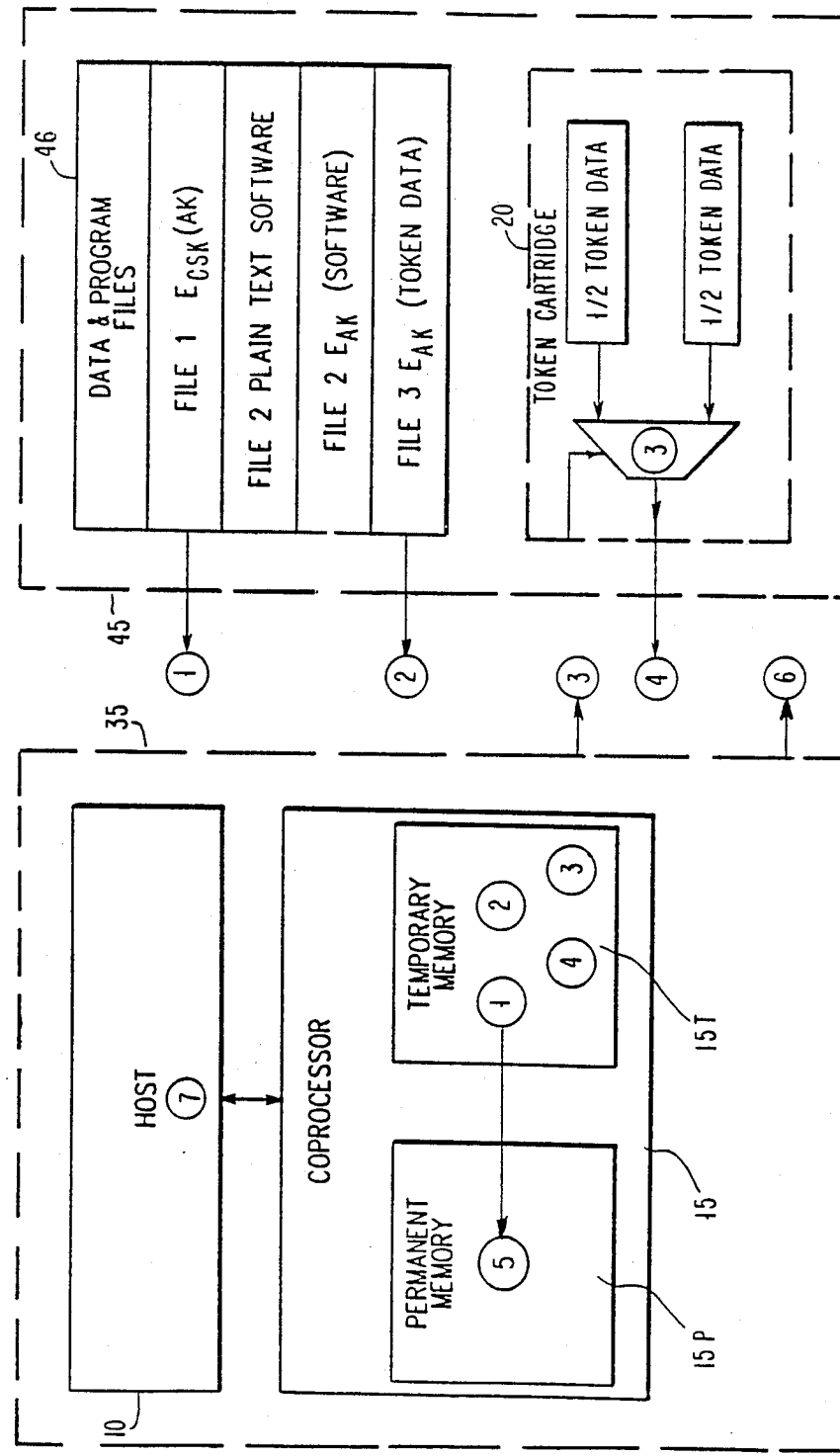
FIG. 5 schematically illustrates the interaction between the composite computing system consisting of the host 10 and the coprocessor 15, and the software distribution package consisting of the token cartridge and the distributable software set (FIG. 3) during an acquire right-to-execute process.
Figure 6:
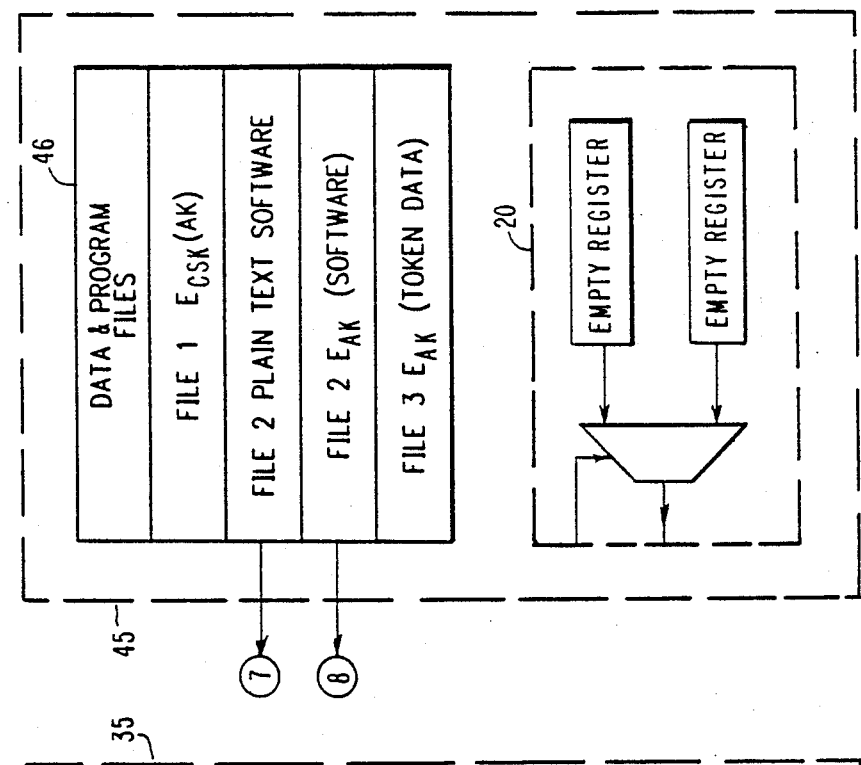
FIG. 6 is similar in FIG. 5 except that it illustrates the interaction of the foregoing components subsequent to an Acquire Right-To-Execute process, that is, during a load, decrypt and run process.
Figure 6:
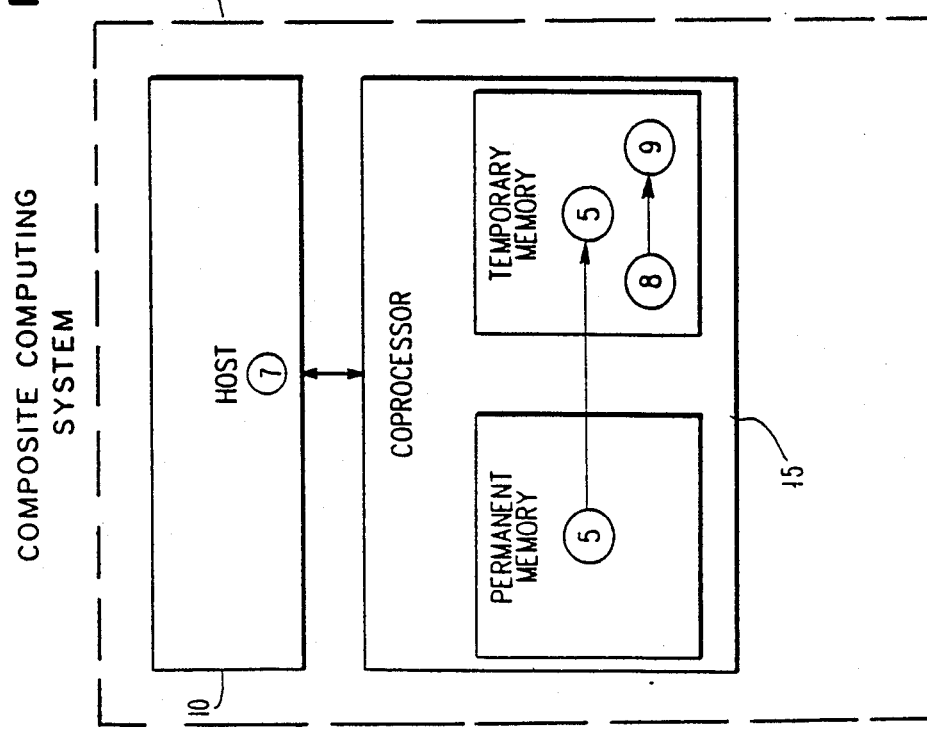

Comparing FIGS. 5 and 6 reveals that, subsequent to the ARE process, the token cartridge 20 has had the token data erased, removed or overwritten so that it is no longer accessible. FIG. 6 shows the registers in the cartridge 20 as "empty". These registers are "empty" in the sense that the clear text token data which had resided there prior to the ARE process has been replaced by the data provided on the connector 23 (see FIG. 2) over the lines D3 and D4. This data is meaningless to the validation process, and thus in terms of information content the registers in the token cartridge 20 are indeed "empty". Upon successful completion of the ARE process, the software decryption key AK, received by the coprocessor 15 in encrypted form $E_{CSK}$(AK) has been decrypted, and in response to successful completion of the ARE, AK has been transferred (5) to the permanent memory 15P of the coprocessor 15. FIG. 6 also illustrates operation of the coprocessor 15 during the LDR. During this process, the software decryption key AK (5) is copied to the temporary memory 15T. The plain text software (file 2) is transferred to the host 10, where it is executable inasmuch as it is in plain text form. The encrypted software (8) is transferred to the coprocessor 15 and resides in the temporary memory 15T. At that location, and employing the software decryption key AK, the encrypted software is decrypted (9) so that it is executable by the coprocessor 15.

Because the coprocessor 15 is secure, the clear text protected software, although it resides in the memory of the coprocessor 15, is unavailable to the user or anyone else. The software is, however, executable by the coprocessor 15, and the results of that execution can be communicated to the host 10. As a result, the composite computing system consisting of the host 10 and the coprocessor 15 cooperates in executing the softwared application package, the host or PC 10 executes the plain text portion, and the coprocessor 15 executes the protected portion, although if desired, the entire application could be protected and run solely on the coprocessor 15. FIGS. 3-6 illustrate an embodiment and application of the invention wherein the encrypted token data is provided to the user on the same medium which supports the application software, and while that medium could be magnetic, it is also within the contemplation of the invention that it could consist of a communication link.

Associating the encrypted token data with the software necessitates that to at least some extent the software distribution medium is unique or relatively unique (by the presence of the encrypted token data). As mentioned above, however, there are advantages if the distributable software medium can be generic and in that embodiment of the invention the encrypted token data does not appear on the software distribution medium (or is not associated when transmitted over a communication link with the application software). It is still essential, however, for the encrypted token data to be communicated to the coprocessor 15, because that information is essential to acquiring the right to execute. In this alternative embodiment of the invention, the hardware cartridge 20 is modified so that it includes at least a register dedicated to storing encrypted token data. The coprocessor 15, in addition to generating the challenge or query which has been described above, also generates a unique command and sufficient clocking pulses to transfer the encrypted token data, in toto, into the coprocessor 15. In this alternative embodiment of the invention then, the hardware cartridge 20 stores not only clear text token data (in the shift registers 120 and 220) but also stores encrypted token data in a third register (not shown in FIG. 2).

Figure 7:
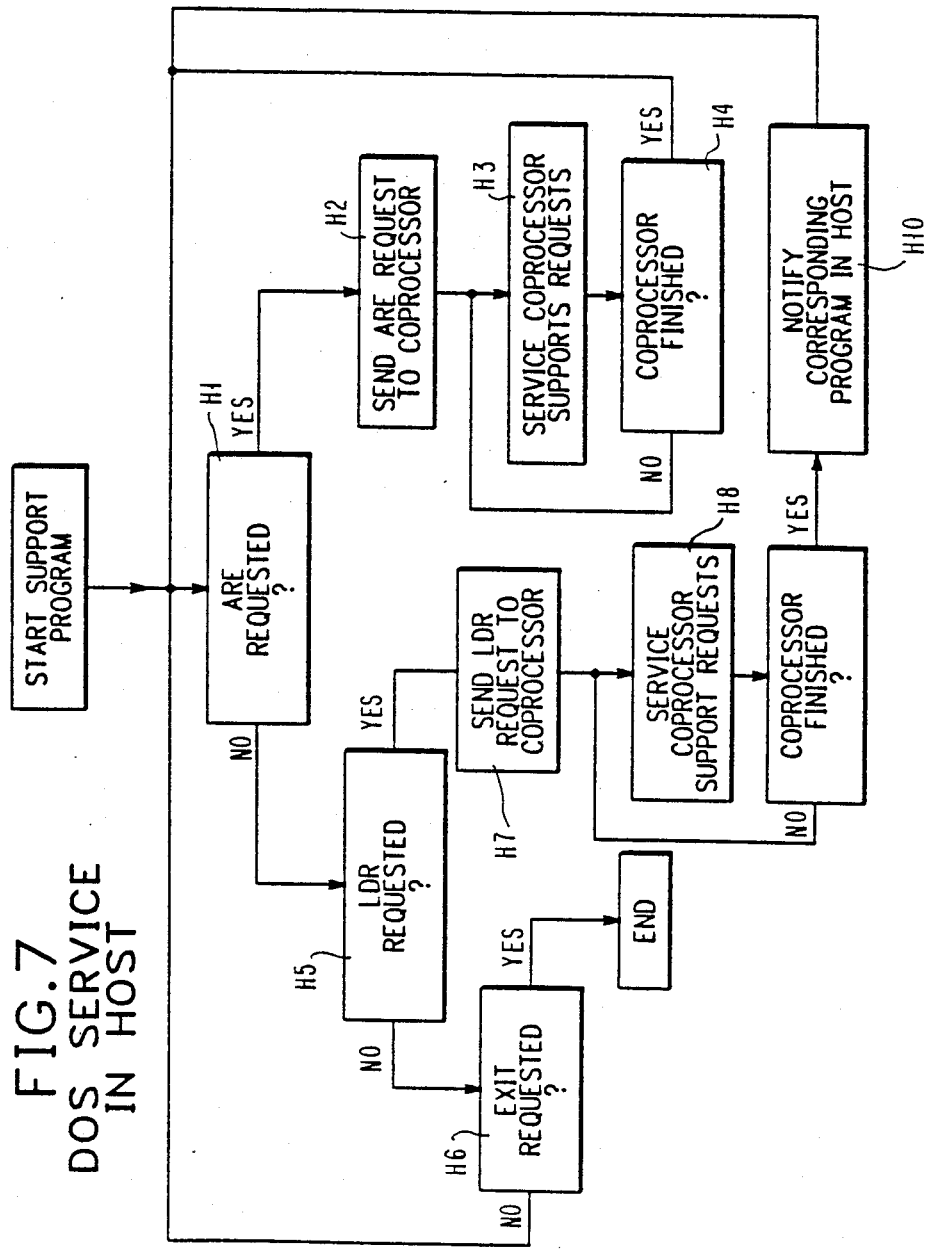
FIG. 7 is a flow diagram illustrating the services executed in the host in accordance with the invention.

FIG. 7 is a flow diagram showing the functions executed in the host 10 in accordance with the invention; the services shown in FIG. 7 are those specific to the invention, other conventional services are not illustrated. As shown in FIG. 7, an initial determination, H1, determines whether or not the ARE process is requested. On first running, any particular application package in accordance with the invention, this request would be present. Accordingly, function H2 is then requested to send the ARE request to the coprocessor 15. A loop is then entered consisting of H3 and H4 in which the host 10 services coprocessor requests until the coprocessor 15 indicates that it has completed the ARE process. On completion of the loop, processing loops back to function H1.

Subsequent to performing steps H1-H4, or at any time the LDR process is to be executed (on the second and any subsequent execution of the application software in accordance with the invention), function H1 directs processing to function H5. H5 determines if the LDR process is requested. If LDR is not requested, then function H6 determines if exiting these services are requested; if not processing loops back to block H1. If an exit is requested then the processing shown in FIG. 7 terminates (END).

On the other hand, if at function H5 an LDR request was recognized, then function H7 is performed to send the LDR request to the coprocessor 15.

A loop is then entered consisting of functions H8 and H9 which is entirely similar to the loop H3-H4.

When the coprocessor H9 indicates that LDR processing has been completed, then function H10 is performed to notify the corresponding program (for example the application program) in the host 10 that the LDR processing is completed.

Figure 8:
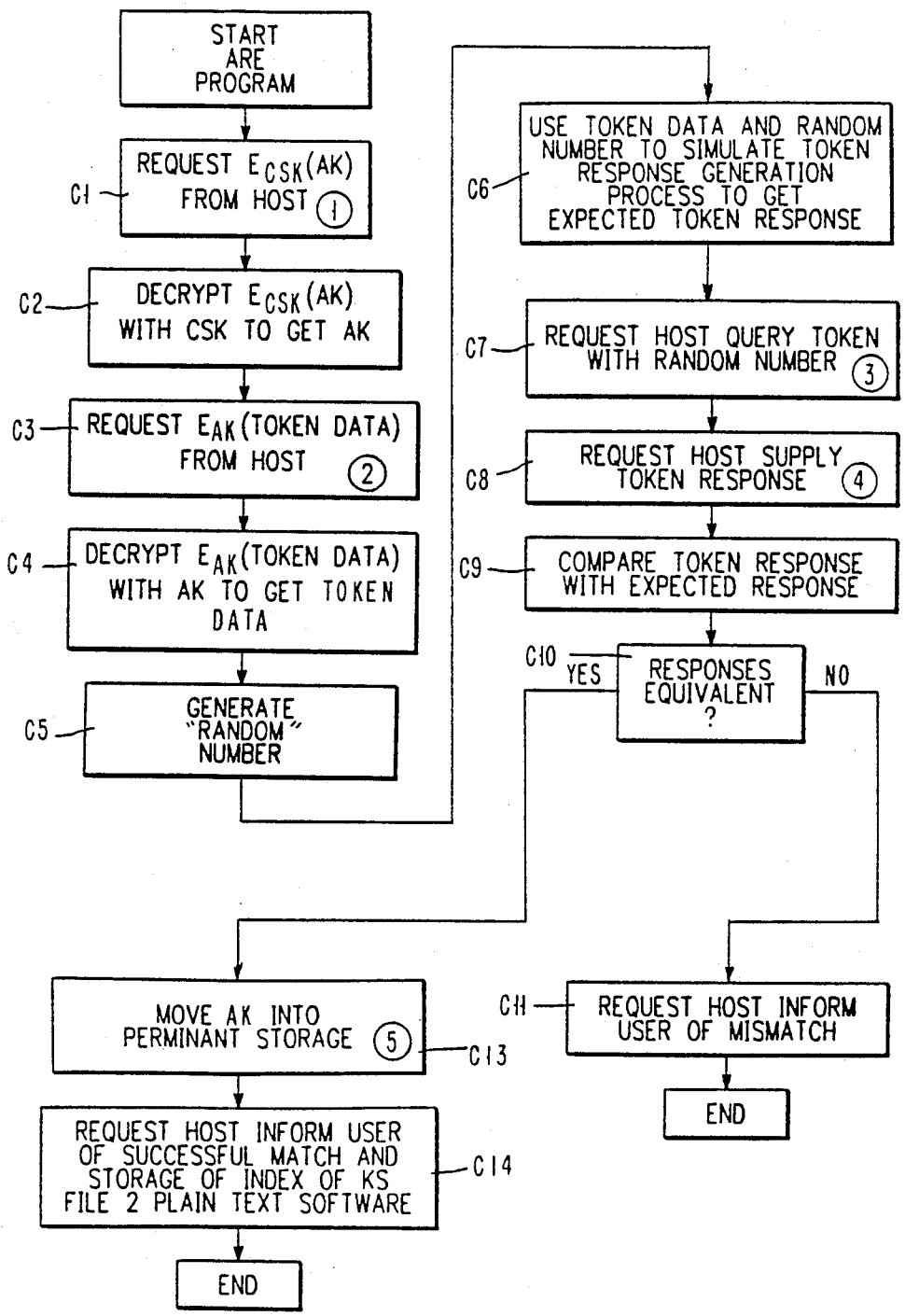
FIG. 8 is a flow diagram of the Acquire Right-to-Execute process executed in the coprocessor 15.

When function H2 is performed, the coprocessor 15 is stimulated to execute its portion of the Acquire Right-To-Execute process. Those functions are shown in FIG. 8. Of the two privilege levels referred to previously, the ARE process is at the higher privilege level since its function is to protect dissemination of rights to execute for the software vendor's protection.

As shown in FIG. 8, function C1 requests the encrypted software decryption key from the host 10. The host 10 has access to this information from the software distribution medium (or communication link in the event the software is distributed in that form). Function C2 decrypts the encrypted software decryption key since it has access to CSK. CSK was installed by the manufacturer of the coprocessor 15 in the permanent 15P, at the time of manufacture. As has been indicated, there may be more than a single CSK, in that event the encrypted software decryption key file would contain a header, index or address to identify the appropriate CSK. Function C3 then requests the encrypted token data from the host. In the event the encrypted token data is associated on the same software distribution medium as is the application, the host 10 has access to it. Alternatively, the encrypted token data could be stored in the hardware cartridge 20; but as already described the host 10 may have access to the hardware cartridge 20, and if it does not, the coprocessor 15 has direct access to the hardware cartridge 20.

Function C4 decrypts the encrypted token data using the already available software decryption key. The decrypted token data is then retained in the temporary memory 15T.

Function C5 then generates the random number which forms the token query. Function C6 combines the random number and the token data to simulate the token response and generates the computed response which is likewise retained in the temporary memory 15T.

Function C7 then requests the host to query the hardware cartridge 20 with the random number (the token query). Of course, if the coprocessor 15 has direct access to the hardware cartridge 20, this function is implemented directly rather than indirectly through the host 10. Function C8 then requests the host to supply the token response, which is also stored in the temporary memory 15T. Function C9 then compares the actual response with the computed or expected response. Function C10 is a branch based on the comparison of function C9. If the computed and actual response of the token compare favorably (typically they would be equivalent) then that is taken as evidence of an authentic token. Function C13 thereafter moves the software decryption key into permanent storage (5). Function C14 then passes a message through the host 10 to inform the user that a successful ARE process has been completed and provides information to the host 10 to identify the location of the software decryption key corresponding to this application. Thereafter, the ARE process terminates.

On the other hand, if the comparison of the actual and computed response of the token was unsuccessful (for example the responses were unequal) then rather than executing functions C13 and C14, function C11 is executed to pass onto the user information that the Right-To-Execute was not acquired. It should be noted that in this event, although the software decryption key is available in the temporary memory 15T, it is not transferred into the permanent memory 15P. Accordingly, the software decryption key is unusable and the application package will not execute.

Figure 9B:
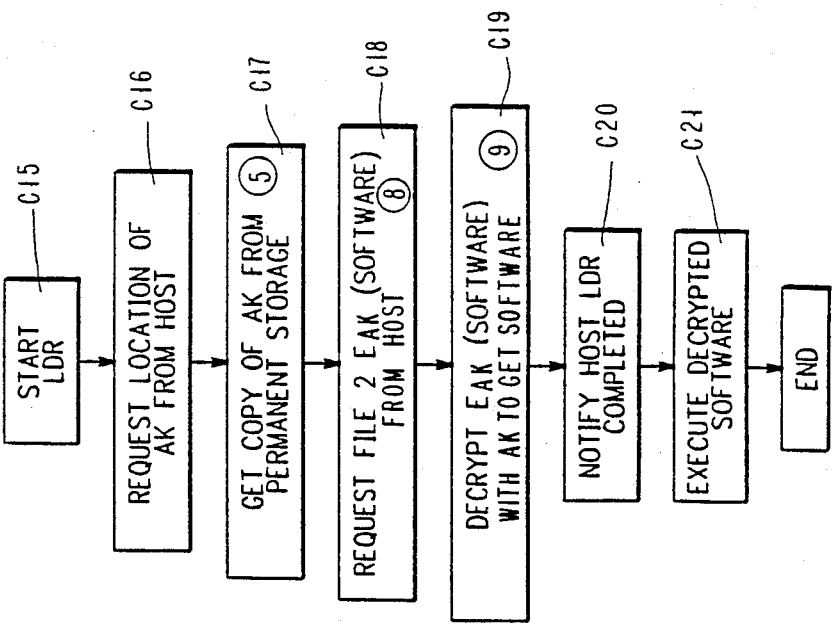
FIG. 9B illustrates the corresponding services executed in the coprocessor in connection with the Load Decrypt and Run process.
Figure 9A:
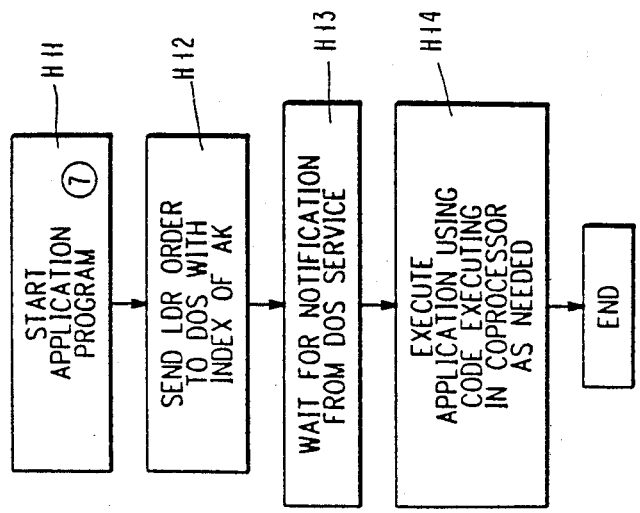
FIG. 9A illustrates the services executed in the host 10 in accordance with a Load Decrypt and Run process.

FIG. 9A illustrates the functions performed in the host during a typical LDR process. Initiating the LDR process is function H11 which starts the application program. On determining that the program is protected, function H12 is performed requesting an LDR order to DOS with the information to determine the location of AK, e.g., the location in the permanent memory of the coprocessor 15 at which the necessary software decryption key is located. This information had been provided to the host and stored with the application program via function C14 at the successful conclusion of the preceding ARE process.

Function H13 then is merely a delay waiting for notification from the DOS service (see FIG. 7). On that notification (H10 - FIG. 7), function H14 is performed to execute the application using code executing in the coprocessor 15 as needed. In order to see how the protected software is executed in the coprocessor, reference is made to FIG. 9B.

As shown in FIG. 9B, when the coprocessor 15 receives an LDR request, function C15 is performed to initiate the functions shown in FIG. 9B. The LDR request is initiated at function H7 (see FIG. 7). Function C16 requests the host to provide information to locate AK. That request is passed through the DOS service (FIG. 7) which responds with the information provided by function H8. With the index information, function C17 obtains a copy of the software decryption key from the permanent storage and loads it into the temporary memory 15T of the coprocessor 15. Function C18 then requests the protected software from the host. The protected software, in encrypted form, is retained in the temporary memory and decrypted, at function C19, using the software decryption key obtained at function C17. The result of function C19 is the clear text version of the protected software; this is retained in the temporary memory 15T of the coprocessor 15. The protection afforded by the logical and physical security of the coprocessor 15 prevents divulgence of the clear text portion of the protected software to the user or anyone else. Function C20 then notifies the host that the LDR process has been completed. Function C21 then executes the decrypted software. Functions C17-C19 are also considered to represent the higher of the two privilege levels since they deal with use of the right to execute, AK. Function C21, on the other hand, is an example of the lower of the two privilege levels. It should be apparent to those skilled in the art that functions H14 and C21 can cooperate using a variety of techniques so that the net result is complete execution of the application software. It is within the scope of the invention that all of the application software is protected. During execution of the protected software by the coprocessor 15, only the results of that execution are provided to the host 10. It should be apparent that the results of execution, which is available to the user, is inadequate as a basis on which to reconstruct clear text of the protected software.

The invention then meets the objects previously stated. More particularly, the software distribution medium can be freely copied or backed up, however, it will not execute except on composite systems including a coprocessor such as the coprocessor 15. Even then, it will only execute on a composite system in which the coprocessor 15 has available to it the necessary software decryption key. Furthermore, in order for the coprocessor 15 to obtain access to the software decryption key, and retain that information in permanent memory, an authentic cartridge 20 is necessary; the cartridge 20 is arranged so that it is difficult to forge or simulate and is usable only on one occasion. The necessary consequence is that a suitable hardware cartridge 20 can authorize one and only one coprocessor 15. While only a single coprocessor 15 will be authorized, that coprocessor 15 is in essence portable so that it could be used with any suitable host 10 to run the protected software. Thus the software vendor achieves the desirable result of separating the protected application software from the right to execute it. His customer, the user, can make as many copies of the protected software as he desires but can only execute it, at any one time, on a single composite computing system.

Although several specific embodiments of the invention have been described, the invention is not to be limited by those descriptions, and rather it is to be construed in accordance with the attached claims.

Having thus described our invention, what we claim as new, and desire to secure by Letters Patent is:

1. A method of restricting use of software to an authorized computer comprising the steps of:
   providing said software in a form in which at least a portion thereof is encrypted,
   providing an encrypted decryption key for decrypting said encrypted software portion,
   providing a physically secure coprocessor coupled to said computer, which coprocessor is capable of decrypting said software if it retains said decryption key,
   coupling a transfer token source to said physically secure coprocessor, which transfer token source stores a token whose presence is required to effect a step of retaining said encrypted decryption key,
   transferring said encrypted decryption key to said physically secure coprocessor along with said token from said transfer token source,
   wherein said transferring step includes the step of altering said transfer token source as said token is transferred to said physically secure coprocessor so that said transfer token source is incapable of again transferring said token.

2. The method of claim 1 which includes the further step of decrypting said encrypted portion of said software in said coprocessor with said decryption key.

3. The method of claim 1 which includes the further step of reproducing said software including said encrypted portion.

4. The method of claim 1 which includes the further step of executing said software on said computer and decrypting said encrypted portion, during said execution, by said coprocessor with said decryption key.

5. The method of claim 1 in which said step of providing said software includes providing a magnetic medium on which said software is recorded.

6. The method of claim 1 in which said step of providing said software includes connecting a communication link to said computer and transmitting said software over said communication link.

7. The method of claim 1 in which said step of providing said physically secure coprocessor and coupling said physically secure coprocessor to said computer includes directly coupling said physically secure coprocessor to an internal bus of said computer.

8. The method of claim 1 in which said step of providing said physically secure coprocessor and coupling said physically secure coprocessor to said computer includes removably coupling said physically secure coprocessor to an input port of said computer.

9. The method of claim 1 in which said source of said transfer token is physically secure.

10. The method of claim 1 which includes the further steps of:
   decrypting, in said coprocessor, said encrypted decryption key using a vendor decryption key stored in said coprocessor,
   using said decryption key to decrypt said encrypted software portion at those times as said computer attempts to execute said software.

11. The method of claim 1 in which said step of altering said source of said transfer token includes destroying said token as stored in said transfer token source.

12. The method of claim 1 in which said step of transferring said transfer token includes the step of verifying, by said coprocessor, that said transfer token is authentic.

13. The method of claim 12 which includes the step of rejecting said transfer token and said encrypted decryption key in the event that said transfer token is not authentic.

14. The method of claim 12 in which said step of transferring said transfer token includes:
   (a) generating a random number and coupling said random number to said transfer token source,
   (b) generating, in response to said random number a selected portion of said stored token and coupling said portion to said coprocessor.

15. The method of claim 14 which includes the further steps of:
   (c) transferring an encrypted token to said coprocessor,
   (d) decrypting said encrypted token to produce a clear text token,
   (e) applying said random number to said clear text token to generate in response a clear text token portion,
   (f) comparing said selected token portion, generated in said step (b) with said clear text token portion, generated in step (e), and
   (g) considering said token source authentic if a result of said step (f) identifies a first relation and considering said token source not authentic if said step (f) identifies any other relation.

16. The method of claim 15 which includes the further step of:
   (h) decrypting said software prior to execution, and in which a key used for said decryption is identical to a key employed in said step (d).

17. The method of claim 1 in which said physically and logically secure coprocessor provides for establishing a dual privilege computation environment, a first lower privilege for executing that portion of said software which had been provided in encrypted form, and a higher level privilege for manipulating said decryption key.

18. A method of restricting execution of software to authorized processors and preventing execution of said software by unauthorized processors comprising the steps of:
   (a) distributing said software in a form in which at least a significant portion is encrypted,
   (b) providing a coprocessor in association with a potentially authorized processor, which coprocessor has a memory space secured against external access for storing decrypted software and operating instructions,
   (c) coupling said software to said processor,
   (d) coupling a distinct right to execute to said coprocessor and storing said distinct right to execute in said secure memory of said coprocessor,
   (e) in response to presence of said distinct right to execute, decrypting and storing said significant portion of said software in said coprocessor, and
   (f) executing said stored software portion in said coprocessor.

19. The method of claim 18 in which, along with said step (f), said processor executes encrypted portions of said software.

20. The method of claim 18 in which said distinct right to execute comprises a decryption key and said step (d) includes:
   (d1) providing a token cartridge storing a clear text token,
   (d2) coupling said token cartridge to said coprocessor,
   (d3) generating a token query in said coprocessor and coupling said token query to said token cartridge,
   (d4) generating, in response to said token query a token response and coupling said token response to said coprocessor,
   (d5) verifying authenticity of said token cartridge, in said coprocessor by testing said token response,
   (d6) if and only if said token cartridge is determined to be authentic, transferring a decryption key, representing said distinct right to execute, into said secure storage of said coprocessor.

21. The method of claim 20 in which said step (e) includes using said decryption key to decrypt said software portion.

22. The method of claim 20 in which said step (d5) includes:
   (d5a) coupling encrypted token data to said coprocessor,
   (d5b) decrypting said encrypted token data in said coprocessor to produce clear text token data,
   (d5c) combining said clear text token data with said token query to produce a computed response,
   (d5d) comparing said computed response with said token response, and
   (d5e) verifying authenticity of said cartridge if said responses are identical, otherwise failing to verify authenticity of said cartridge.

23. The method of claim 22 in which said encrypted token data resides in common on a medium supporting said software.

24. The method of claim 22 in which said encrypted token data is stored in said cartridge.

25. The method of claim 22 in which said encrypted token data is coupled over a communication link to said coprocessor.

26. The method of claim 20 in which said step (d4) includes the step of erasing said clear text token data as said token response is generated.

27. The method of claim 20 in which said step (d3) includes the step of coupling said token query to said token cartridge in a bit serial form of N bit length, where N is an integer, and in which said step (d4) includes the steps of:
 (d4a) dividing said clear text token data into first and second portions,
 (d4b) for each bit of said query, selecting a bit from either said first or second portions and returning said selected bit as a portion of said token response, and replacing both the selected bit and a corresponding unselected bit of said first and second portions,
whereby after a last bit of the token response is generated said clear text token data in said token cartridge is at least reduced in bit length by twice the bit length of said query.

28. The method of claim 27 in which said bit length of said query is equal to the bit length of said clear text token data portions whereby at conclusion of generation of said token response all said clear text token data has been replaced.

29. A method of securing protected software against unauthorized use without perturbing existing channels of software distribution and, at the same time not interfering in users creation of unlimited backup copies of protected software, said method comprising the steps of:
 (a) providing to a user a physically secure coprocessor and coupling said coprocessor to a user host computer to support bidirectional communication therebetween to create a composite computing system including said host computer and said coprocessor,
 (b) providing logical security to said coprocessor by:
  (1) providing a first privilege level including first level secure memory and first level operating instructions, secured against access or variation by said user, for executing protected software,
  (2) providing a second privilege level including second level secure memory and second level operating instructions, secured against access or variation by said user or any author of protected software, for controlling authorization for execution of said protected software by said first privilege level,
 (c) distributing protected software in a form in at which at least a portion is inexecutable by said host computer but which is executable by said coprocessor but only with authorization by said second privilege level,
 (d) distributing a further tangible element distinct from said protected software representing a right to execute said protected software,
 (e) providing said composite computing system access to said protected software and to said further tangible element,
 (f) verifying authenticity of said further tangible element by said coprocessor at said second privilege level,
 (g) altering said second level secure memory in a distinctive fashion to reflect a determination by said second privilege level of authenticity of said tangible element, and
 (h) executing said protected software so long as said alteration of said second privilege level secure memory is detected and denying said request if said alteration is not present.

30. A method as recited in claim 29 in which said software as distributed in said step (c) has at least a portion encrypted and said second privilege level subsequent to performance of said step (f) has access to a decryption key and in which said step (h) comprises performing the following steps on each subsequent request by said user to execute said protected software:
 (1) responding, at said second privilege level to check for said alteration of said second level secure memory, if said alteration is present honoring said request by;
  (a) initiating decryption of said protected software and storage of said decrypted software in said first privilege level secure memory,
  (b) authorizing execution of said decrypted software by said first privilege level and initiating operation of said first privilege level,
and, if said alteration is not present, refusing said request.

31. A method as recited in claim 29 wherein said protected software as distributed in said step (c) includes a portion which is encrypted under a software key which itself is distributed encrypted under a different key, and in which said second privilege level has access to said different key so that said encrypted software key can be decrypted by said second privilege level, and in which said step (g) includes:
 (1) decrypting said software key with said second key,
 (2) altering said second privilege level secure memory by writing said software key therein.

32. A method as recited in claim 31 in which said composite computing system is provided information with which to verify said tangible element and in which said step (d) includes:
 (1) providing said tangible element with physical security,
 (2) providing said tangible element with electronic storage having a destructive read function, and
 (3) storing a verifiable entity in said electronic storage.

33. A method as recited in claim 32 in which said information with which to verify said tangible element comprises said verifiable entity encrypted under said software key and in which said step (f) includes:
 (1) generating a random number and storing said random number for later use,
 (2) transmitting said random number to said tangible element,
 (3) transmitting from said tangible element a reply comprising a transformation of said verifiable entity determined by said random number,
 (4) using said software key to decrypt said encrypted verifiable entity,
 (5) simulating at said coprocessor said transformation using said random number and said decrypted verifiable entity to generate an expected reply, and
 (6) comparing said reply and expected reply and determining authenticity only if a result of said comparison is an equality,
whereby said destructive read property of said tangible element restricts it to a use once device and review of said random number and said reply is inadequate to specify said verifiable entity so that operation of said tangible device cannot be simulated notwithstanding access to said random number and said reply.

34. A method as recited in claim 29 in which said composite computing system is provided information with which to verify said tangible element and in which said step (d) includes:
(1) providing said tangible element with physical security,
(2) providing said tangible element with electronic storage having a destructive read function, and
(3) storing a verifiable entity in said electronic storage.

35. A method as recited in claim 34 wherein:
said protected software as distributed in said step (c) includes a portion which is encrypted under a software key which itself is distributed encrypted under a different key,
in which said second privilege level has access to said different key so that said encrypted software key can be decrypted by said second privilege level,
in which said information with which to verify said tangible element comprises said verifiable entity encrypted under said software key, and
in which said step (f) includes:
(1) generating a random number and storing said random number for later use,
(2) transmitting said random number to said tangible element,
(3) transmitting from said tangible element a reply comprising a transformation of said verifiable entity determined by said random number,
(4) using said software key to decrypt said encrypted verifiable entity,
(5) simulating at said coprocessor said transformation using said random number and said decrypted verifiable entity to generate an expected reply, and
(6) comparing said reply and expected reply and determining authenticity only if a result of said comparison is an equality, whereby said destructive read property of said tangible element restricts it to a use once device and review of said random number and said reply is inadequate to specify said verifiable entity so that operation of said tangible device cannot be simulated notwithstanding access to said random number and said reply.

* * * * *